(12) United States Patent
Shrivastava et al.

(10) Patent No.: US 12,366,111 B2
(45) Date of Patent: *Jul. 22, 2025

(54) TRUNK LINE WINDOW CONTROLLERS

(71) Applicant: View, Inc., Milpitas, CA (US)

(72) Inventors: Dhairya Shrivastava, Los Altos, CA (US); Sonny Jurgen Ducote, Dublin, CA (US); Kevin Kazuo Kaneshiro, San Jose, CA (US); Thomas Lee Harrell, Morgan Hill, CA (US); Scott Michael Schmidt, Reno, NV (US); Jacob Voth, San Bruno, CA (US); Edward Joseph Parvizian, Danville, CA (US)

(73) Assignee: View Operating Corporation, San Jose, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/634,150

(22) PCT Filed: Aug. 18, 2020

(86) PCT No.: PCT/US2020/070427
§ 371 (c)(1),
(2) Date: Feb. 9, 2022

(87) PCT Pub. No.: WO2021/035252
PCT Pub. Date: Feb. 25, 2021

(65) Prior Publication Data
US 2022/0316269 A1    Oct. 6, 2022

Related U.S. Application Data

(63) Continuation-in-part of application No. 15/733,765, filed as application No. PCT/US2019/019455 on Feb.
(Continued)

(51) Int. Cl.
*G02F 1/15*      (2019.01)
*E06B 9/24*      (2006.01)
(Continued)

(52) U.S. Cl.
CPC ........ *E06B 9/24* (2013.01); *E06B 2009/2464* (2013.01); *G02F 1/163* (2013.01)

(58) Field of Classification Search
CPC ...... G02F 1/1523; G02F 1/1533; G02F 1/155; G02F 10/102; G02F 1/163; G09G 3/16
(Continued)

(56) References Cited

U.S. PATENT DOCUMENTS 4,129,861 A    12/1978  Giglia
4,553,085 A    11/1985  Canzano
(Continued)

FOREIGN PATENT DOCUMENTS

CN    1161092 A    10/1997
CN    1219251 A    6/1999
(Continued)

OTHER PUBLICATIONS

"Sage Product Highlights" screenshot, accessed Aug. 28, 2015, 1 page.
(Continued)

*Primary Examiner* — Dawayne Pinkney
(74) *Attorney, Agent, or Firm* — Cha & Reiter, LLC

(57) ABSTRACT

A trunk line for providing a communication path to a network of optically switchable windows is described.

25 Claims, 21 Drawing Sheets

Related U.S. Application Data 25, 2019, now Pat. No. 11,384,596, and a continuation-in-part of application No. 16/946,140, filed on Jun. 8, 2020, now Pat. No. 11,566,468, which is a continuation of application No. 16/295,142, filed on Mar. 7, 2019, now Pat. No. 10,704,322, which is a continuation of application No. 15/268,204, filed on Sep. 16, 2016, now Pat. No. 10,253,558.

(60) Provisional application No. 62/890,544, filed on Aug. 22, 2019, provisional application No. 62/660,170, filed on Apr. 19, 2018, provisional application No. 62/687,187, filed on Jun. 19, 2018, provisional application No. 62/696,704, filed on Jul. 11, 2018, provisional application No. 62/220,514, filed on Sep. 18, 2015.

(51) Int. Cl.
*F21V 14/00* (2018.01)
*G02F 1/157* (2006.01)
*G09G 3/19* (2006.01)
*G02F 1/163* (2006.01)

(58) Field of Classification Search
USPC ............. 359/265–275, 277, 245–247, 242; 345/49, 105; 250/70; 348/814, 817; 438/929; 349/182–186
See application file for complete search history.

(56) References Cited

U.S. PATENT DOCUMENTS

| | | |
|---|---|---|
| 5,242,313 A | 9/1993 | Logerot et al. |
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 5,867,495 A | 2/1999 | Elliott et al. |
| 6,039,390 A | 3/2000 | Agrawal et al. |
| 6,055,089 A | 4/2000 | Schulz et al. |
| 6,066,801 A | 5/2000 | Kodaira et al. |
| 6,084,758 A | 7/2000 | Clarey et al. |
| 6,232,557 B1 | 5/2001 | Lounsbury et al. |
| 6,262,831 B1 | 7/2001 | Bauer et al. |
| 6,344,748 B1 | 2/2002 | Gannon |
| 6,407,847 B1 | 6/2002 | Poll et al. |
| 6,567,708 B1 | 5/2003 | Bechtel et al. |
| 6,707,590 B1 | 3/2004 | Bartsch |
| 6,848,933 B1 | 2/2005 | Delaney, III et al. |
| 6,897,936 B1 | 5/2005 | Li et al. |
| 6,965,813 B2 | 11/2005 | Granqvist et al. |
| 7,133,181 B2 | 11/2006 | Greer |
| 7,391,420 B1 | 6/2008 | Coyne |
| 7,536,370 B2 | 5/2009 | Masurkar |
| 7,672,104 B2 | 3/2010 | Reynolds et al. |
| 7,684,105 B2 | 3/2010 | Lamontagne et al. |
| 7,739,138 B2 | 6/2010 | Chauhan et al. |
| 7,800,812 B2 | 9/2010 | Moskowitz |
| 7,941,245 B1 | 5/2011 | Popat |
| 8,140,276 B2 | 3/2012 | Walters et al. |
| 8,149,756 B2 | 4/2012 | Hottinen |
| 8,213,074 B1 | 7/2012 | Shrivastava et al. |
| 8,254,013 B2 | 8/2012 | Mehtani et al. |
| 8,290,627 B2 | 10/2012 | Richards et al. |
| 8,509,400 B2 | 8/2013 | Liu et al. |
| 8,705,162 B2 | 4/2014 | Brown et al. |
| 8,800,221 B1 | 8/2014 | Header |
| 8,843,238 B2 | 9/2014 | Wenzel et al. |
| 8,963,378 B1 * | 2/2015 | Fornage ............... H01R 13/639 307/147 |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,250,494 B2 | 2/2016 | Podbelski et al. |
| 9,300,581 B1 | 3/2016 | Hui et al. |
| 9,348,192 B2 | 5/2016 | Brown et al. |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,494,055 B2 | 11/2016 | Rusche |
| 9,551,913 B2 | 1/2017 | Kim et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,898,912 B1 | 2/2018 | Jordan, II et al. |
| 9,906,956 B1 | 2/2018 | Huang |
| 9,946,138 B2 | 4/2018 | Shrivastava et al. |
| 9,948,387 B2 | 4/2018 | Frankel et al. |
| 10,001,691 B2 | 6/2018 | Shrivastava et al. |
| 10,031,356 B2 | 7/2018 | Van Oosten et al. |
| 10,110,631 B2 | 10/2018 | Bauer et al. |
| 10,137,764 B2 | 11/2018 | Driscoll et al. |
| 10,253,558 B2 | 4/2019 | Vigano et al. |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,303,035 B2 | 5/2019 | Brown et al. |
| 10,329,839 B2 | 6/2019 | Fasi et al. |
| 10,365,531 B2 | 7/2019 | Shrivastava et al. |
| 10,365,532 B2 | 7/2019 | Vigano et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,505,751 B2 | 12/2019 | Casilli |
| 10,514,963 B2 | 12/2019 | Shrivastava et al. |
| 10,532,268 B2 | 1/2020 | Tran et al. |
| 10,704,322 B2 | 7/2020 | Vigano et al. |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,859,887 B2 | 12/2020 | Vigano et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,989,977 B2 | 4/2021 | Shrivastava et al. |
| 11,016,357 B2 | 5/2021 | Brown et al. |
| 11,054,792 B2 | 7/2021 | Shrivastava et al. |
| 11,073,800 B2 | 7/2021 | Shrivastava et al. |
| 11,150,616 B2 | 10/2021 | Shrivastava et al. |
| 11,168,910 B2 | 11/2021 | Alcala Perez |
| 11,182,970 B1 | 11/2021 | Kathol |
| 11,294,254 B2 | 4/2022 | Patterson et al. |
| 11,320,713 B2 | 5/2022 | Tinianov et al. |
| 11,384,596 B2 | 7/2022 | Shrivastava et al. |
| 11,436,061 B2 | 9/2022 | Shrivastava et al. |
| 11,566,468 B2 | 1/2023 | Vigano et al. |
| 11,579,571 B2 | 2/2023 | Shrivastava et al. |
| 11,656,521 B2 | 5/2023 | Tinianov et al. |
| 11,681,197 B2 | 6/2023 | Shrivastava et al. |
| 11,687,045 B2 | 6/2023 | Shrivastava et al. |
| 11,733,660 B2 | 8/2023 | Shrivastava et al. |
| 11,740,948 B2 | 8/2023 | Shrivastava et al. |
| 11,750,594 B2 | 9/2023 | Vangati et al. |
| 11,754,902 B2 | 9/2023 | Brown et al. |
| 11,868,103 B2 | 1/2024 | Shrivastava et al. |
| 11,882,111 B2 | 1/2024 | Vangati et al. |
| 11,892,737 B2 | 2/2024 | Shrivastava et al. |
| 11,947,234 B2 | 4/2024 | Tinianov et al. |
| 11,948,015 B2 | 4/2024 | Shrivastava et al. |
| 12,055,834 B2 | 8/2024 | Vigano et al. |
| 12,078,906 B2 | 9/2024 | Shrivastava et al. |

(56) References Cited

U.S. PATENT DOCUMENTS

| | | |
|---|---|---|
| 12,087,997 B2 | 9/2024 | Brown et al. |
| 12,130,597 B2 | 10/2024 | Shrivastava et al. |
| 12,206,660 B2 | 1/2025 | Vangati et al. |
| 2001/0005083 A1 | 6/2001 | Serizawa et al. |
| 2002/0024424 A1 | 2/2002 | Burns et al. |
| 2002/0027504 A1 | 3/2002 | Davis et al. |
| 2002/0149829 A1 | 10/2002 | Mochizuka et al. |
| 2003/0072144 A1 | 4/2003 | Malkowski, Jr. et al. |
| 2003/0101154 A1 | 5/2003 | Hisano et al. |
| 2003/0169574 A1 | 9/2003 | Maruyama et al. |
| 2003/0191546 A1 | 10/2003 | Bechtel et al. |
| 2003/0227663 A1 | 12/2003 | Agrawal et al. |
| 2004/0001056 A1 | 1/2004 | Atherton et al. |
| 2004/0215520 A1 | 10/2004 | Butler et al. |
| 2004/0236620 A1 | 11/2004 | Chauhan et al. |
| 2005/0157675 A1 | 7/2005 | Feder et al. |
| 2005/0270620 A1 | 12/2005 | Bauer et al. |
| 2005/0270621 A1 | 12/2005 | Bauer et al. |
| 2006/0018000 A1 | 1/2006 | Greer |
| 2006/0107616 A1 | 5/2006 | Ratti et al. |
| 2006/0158805 A1 | 7/2006 | Malvino |
| 2006/0174333 A1 | 8/2006 | Thomas et al. |
| 2006/0202648 A1 | 9/2006 | O'Higgins et al. |
| 2006/0279527 A1 | 12/2006 | Zehner et al. |
| 2007/0008603 A1 | 1/2007 | Sotzing et al. |
| 2007/0053053 A1 | 3/2007 | Moskowitz |
| 2007/0067048 A1 | 3/2007 | Bechtel et al. |
| 2007/0115979 A1 | 5/2007 | Balay et al. |
| 2007/0135971 A1 | 6/2007 | Andarawis et al. |
| 2007/0188841 A1 | 8/2007 | Moeller et al. |
| 2007/0285759 A1 | 12/2007 | Ash et al. |
| 2008/0019068 A1 | 1/2008 | Reynolds et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0172312 A1 | 7/2008 | Synesiou et al. |
| 2008/0184350 A1 | 7/2008 | Chu |
| 2008/0186562 A2 | 8/2008 | Moskowitz |
| 2008/0211682 A1 | 9/2008 | Hyland et al. |
| 2008/0238706 A1 | 10/2008 | Kenwright |
| 2009/0015740 A1 | 1/2009 | Sagitov et al. |
| 2009/0163170 A1 | 6/2009 | Norp et al. |
| 2009/0222223 A1 | 9/2009 | Walters et al. |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0052844 A1 | 3/2010 | Wesby |
| 2010/0172010 A1 | 7/2010 | Gustavsson et al. |
| 2010/0188057 A1 | 7/2010 | Tarng |
| 2010/0218010 A1 | 8/2010 | Musti et al. |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0286839 A1 | 11/2010 | Iaquinangelo et al. |
| 2010/0286937 A1 | 11/2010 | Hedley et al. |
| 2010/0315693 A1 | 12/2010 | Lam et al. |
| 2011/0046810 A1 | 2/2011 | Bechtel et al. |
| 2011/0050756 A1 | 3/2011 | Cassidy et al. |
| 2011/0071685 A1 | 3/2011 | Huneycutt et al. |
| 2011/0083152 A1 | 4/2011 | Centore, III et al. |
| 2011/0097081 A1 | 4/2011 | Gupta et al. |
| 2011/0124313 A1 | 5/2011 | Jones |
| 2011/0137853 A1 | 6/2011 | Mackay |
| 2011/0148218 A1 | 6/2011 | Rozbicki |
| 2011/0154022 A1 | 6/2011 | Cheng et al. |
| 2011/0164317 A1 | 7/2011 | Vergohl et al. |
| 2011/0223886 A1 | 9/2011 | Nasielski et al. |
| 2011/0255142 A1 | 10/2011 | Ash et al. |
| 2011/0261429 A1 | 10/2011 | Sbar et al. |
| 2011/0304899 A1 | 12/2011 | Kwak et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0140492 A1 | 6/2012 | Alvarez |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0229275 A1 | 9/2012 | Mattern |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0268369 A1 | 10/2012 | Kikkeri |
| 2012/0275008 A1 | 11/2012 | Pradhan et al. |
| 2012/0293855 A1 | 11/2012 | Shrivastava et al. |
| 2013/0013921 A1 | 1/2013 | Bhathena et al. |
| 2013/0024029 A1 | 1/2013 | Tran et al. |
| 2013/0054033 A1 | 2/2013 | Casilli |
| 2013/0060357 A1 | 3/2013 | Li et al. |
| 2013/0073681 A1 | 3/2013 | Jiang et al. |
| 2013/0085614 A1 | 4/2013 | Wenzel et al. |
| 2013/0085615 A1 | 4/2013 | Barker |
| 2013/0085616 A1 | 4/2013 | Wenzel |
| 2013/0088331 A1 | 4/2013 | Cho et al. |
| 2013/0131869 A1 | 5/2013 | Majewski et al. |
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0196600 A1 | 8/2013 | Capers et al. |
| 2013/0241299 A1 | 9/2013 | Snyker et al. |
| 2013/0243425 A1 | 9/2013 | Franklin |
| 2013/0271812 A1 | 10/2013 | Brown et al. |
| 2013/0271813 A1 | 10/2013 | Brown |
| 2013/0271814 A1 | 10/2013 | Brown |
| 2013/0278989 A1 | 10/2013 | Lam et al. |
| 2013/0306615 A1 | 11/2013 | Rozbicki et al. |
| 2014/0001977 A1 | 1/2014 | Zacharchuk et al. |
| 2014/0101573 A1 | 4/2014 | Kuo |
| 2014/0156097 A1 | 6/2014 | Nesler et al. |
| 2014/0160550 A1 | 6/2014 | Brown et al. |
| 2014/0170863 A1 | 6/2014 | Brown |
| 2014/0171016 A1 | 6/2014 | Sennett et al. |
| 2014/0172557 A1 | 6/2014 | Eden et al. |
| 2014/0182350 A1 | 7/2014 | Bhavaraju et al. |
| 2014/0236323 A1 | 8/2014 | Brown et al. |
| 2014/0243033 A1 | 8/2014 | Wala et al. |
| 2014/0249876 A1 | 9/2014 | Wu et al. |
| 2014/0268287 A1 | 9/2014 | Brown et al. |
| 2014/0273911 A1 | 9/2014 | Dunn et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368899 A1 | 12/2014 | Greer |
| 2014/0371931 A1 | 12/2014 | Lin et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0060648 A1 | 3/2015 | Brown et al. |
| 2015/0098121 A1 | 4/2015 | Turnbull et al. |
| 2015/0109653 A1 | 4/2015 | Greer et al. |
| 2015/0116811 A1 | 4/2015 | Shrivastava et al. |
| 2015/0120297 A1 | 4/2015 | Meruva |
| 2015/0129140 A1 | 5/2015 | Dean et al. |
| 2015/0137792 A1 | 5/2015 | Filippi et al. |
| 2015/0160525 A1 | 6/2015 | Shi |
| 2015/0219975 A1 | 8/2015 | Phillips et al. |
| 2015/0253367 A1 | 9/2015 | Flammer, III et al. |
| 2015/0378230 A1 | 12/2015 | Gudmunson et al. |
| 2015/0378231 A1 | 12/2015 | Greer et al. |
| 2016/0054633 A1 | 2/2016 | Brown et al. |
| 2016/0054634 A1 | 2/2016 | Brown et al. |
| 2016/0070151 A1 | 3/2016 | Shrivastava et al. |
| 2016/0109778 A1 | 4/2016 | Shrivastava et al. |
| 2016/0124283 A1 | 5/2016 | Brown et al. |
| 2016/0134932 A1 | 5/2016 | Karp et al. |
| 2016/0135175 A1 | 5/2016 | Tarlazzi |
| 2016/0147100 A1 | 5/2016 | Van Oosten et al. |
| 2016/0154290 A1 | 6/2016 | Brown et al. |

(56) References Cited

U.S. PATENT DOCUMENTS

| | | |
|---|---|---|
| 2016/0170402 A1 | 6/2016 | Lindström |
| 2016/0202589 A1 | 7/2016 | Nagel et al. |
| 2016/0203403 A1 | 7/2016 | Nagel et al. |
| 2016/0225832 A1 | 8/2016 | Kwon et al. |
| 2016/0231354 A1 | 8/2016 | Rayman et al. |
| 2016/0261837 A1 | 9/2016 | Thompson et al. |
| 2017/0063429 A1 | 3/2017 | Flask |
| 2017/0068414 A1 | 3/2017 | Plumb |
| 2017/0070457 A1 | 3/2017 | Sachs |
| 2017/0075183 A1 | 3/2017 | Brown |
| 2017/0075323 A1 | 3/2017 | Shrivastava et al. |
| 2017/0077988 A1 | 3/2017 | Flask |
| 2017/0080341 A1 | 3/2017 | Mao et al. |
| 2017/0082903 A1 | 3/2017 | Vigano et al. |
| 2017/0085834 A1 | 3/2017 | Kim et al. |
| 2017/0097259 A1 | 4/2017 | Brown et al. |
| 2017/0122802 A1 | 5/2017 | Brown et al. |
| 2017/0131610 A1 | 5/2017 | Brown et al. |
| 2017/0139301 A1 | 5/2017 | Messere et al. |
| 2017/0146884 A1 | 5/2017 | Vigano et al. |
| 2017/0147023 A1 | 5/2017 | Kumar et al. |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0223312 A1 | 8/2017 | McNelley et al. |
| 2017/0234067 A1 | 8/2017 | Fasi et al. |
| 2017/0243122 A1 | 8/2017 | Komatsu et al. |
| 2017/0251488 A1 | 8/2017 | Urban et al. |
| 2017/0253801 A1 | 9/2017 | Bae et al. |
| 2017/0264865 A1 | 9/2017 | Huangfu |
| 2017/0272317 A1 | 9/2017 | Singla et al. |
| 2017/0279930 A1 | 9/2017 | Zhang |
| 2017/0284691 A1 | 10/2017 | Sinha et al. |
| 2017/0285432 A1 | 10/2017 | Shrivastava et al. |
| 2017/0285433 A1 | 10/2017 | Shrivastava et al. |
| 2017/0328121 A1 | 11/2017 | Purdy et al. |
| 2017/0347129 A1 | 11/2017 | Levi et al. |
| 2017/0364046 A1 | 12/2017 | Westrick, Jr. et al. |
| 2017/0364395 A1 | 12/2017 | Shrivastava et al. |
| 2018/0004059 A1 | 1/2018 | Jovanovic |
| 2018/0076978 A1 | 3/2018 | Schubert et al. |
| 2018/0090992 A1 | 3/2018 | Shrivastava et al. |
| 2018/0106098 A1 | 4/2018 | Unveren et al. |
| 2018/0129172 A1 | 5/2018 | Shrivastava et al. |
| 2018/0144712 A1 | 5/2018 | Threlkel et al. |
| 2018/0176799 A1 | 6/2018 | Lange et al. |
| 2018/0189117 A1 | 7/2018 | Shrivastava et al. |
| 2018/0241587 A1 | 8/2018 | Bull et al. |
| 2018/0252423 A1 | 9/2018 | Hieke et al. |
| 2018/0267380 A1 | 9/2018 | Shrivastava et al. |
| 2018/0284555 A1 | 10/2018 | Klawuhn et al. |
| 2018/0321042 A1 | 11/2018 | Brewer et al. |
| 2018/0335939 A1 | 11/2018 | Karunamuni et al. |
| 2019/0028287 A1 | 1/2019 | Jin et al. |
| 2019/0155122 A1 | 5/2019 | Brown et al. |
| 2019/0203528 A1 | 7/2019 | Vigano et al. |
| 2019/0215694 A1 | 7/2019 | Rubin et al. |
| 2019/0235451 A1 | 8/2019 | Shrivastava et al. |
| 2019/0271895 A1 | 9/2019 | Shrivastava et al. |
| 2019/0294017 A1 | 9/2019 | Vigano et al. |
| 2019/0320033 A1 | 10/2019 | Nagata et al. |
| 2019/0327320 A1 | 10/2019 | Rubin et al. |
| 2019/0331978 A1 | 10/2019 | Shrivastava et al. |
| 2019/0347141 A1 | 11/2019 | Shrivastava et al. |
| 2019/0353972 A1 | 11/2019 | Shrivastava et al. |
| 2019/0361411 A1 | 11/2019 | Park et al. |
| 2019/0384652 A1 | 12/2019 | Shrivastava et al. |
| 2020/0041963 A1 | 2/2020 | Shrivastava et al. |
| 2020/0041967 A1 | 2/2020 | Shrivastava et al. |
| 2020/0045261 A1 | 2/2020 | Lim et al. |
| 2020/0057421 A1 | 2/2020 | Trikha et al. |
| 2020/0067865 A1 | 2/2020 | Jiménez et al. |
| 2020/0103841 A1 | 4/2020 | Pillai et al. |
| 2020/0150508 A1 | 5/2020 | Patterson et al. |
| 2020/0162856 A1 | 5/2020 | Ziv et al. |
| 2020/0241379 A1 | 7/2020 | Barnum et al. |
| 2020/0257179 A1 | 8/2020 | Barnum et al. |
| 2020/0318426 A1 | 10/2020 | Vigano et al. |
| 2020/0387041 A1 | 12/2020 | Shrivastava et al. |
| 2021/0021788 A1 | 1/2021 | McNelley et al. |
| 2021/0063835 A1 | 3/2021 | Vigano et al. |
| 2021/0063836 A1 | 3/2021 | Patterson et al. |
| 2021/0132458 A1 | 5/2021 | Trikha et al. |
| 2021/0165696 A1 | 6/2021 | Shrivastava et al. |
| 2021/0191221 A1 | 6/2021 | Shrivastava et al. |
| 2021/0210053 A1 | 7/2021 | Ng et al. |
| 2021/0232015 A1 | 7/2021 | Brown et al. |
| 2021/0246719 A1 | 8/2021 | Shrivastava et al. |
| 2021/0302799 A1 | 9/2021 | Khanna |
| 2021/0373511 A1 | 12/2021 | Shrivastava et al. |
| 2021/0383804 A1 | 12/2021 | Makker et al. |
| 2021/0390953 A1 | 12/2021 | Makker et al. |
| 2021/0405493 A1 | 12/2021 | Tinianov et al. |
| 2022/0011729 A1 | 1/2022 | Shrivastava et al. |
| 2022/0121078 A1 | 4/2022 | Vollen et al. |
| 2022/0159077 A1 | 5/2022 | Shrivastava et al. |
| 2022/0171248 A1 | 6/2022 | Shrivastava et al. |
| 2022/0179275 A1 | 6/2022 | Patterson et al. |
| 2022/0231399 A1 | 7/2022 | Brown et al. |
| 2022/0244610 A1 | 8/2022 | Tinianov et al. |
| 2022/0298850 A1 | 9/2022 | Shrivastava et al. |
| 2022/0337596 A1 | 10/2022 | Smith et al. |
| 2022/0365494 A1 | 11/2022 | Shrivastava et al. |
| 2022/0365830 A1 | 11/2022 | Shrivastava et al. |
| 2023/0041490 A1 | 2/2023 | Vangati et al. |
| 2023/0074720 A1 | 3/2023 | Brown et al. |
| 2023/0107673 A1 | 4/2023 | Vigano et al. |
| 2023/0111311 A1 | 4/2023 | Shrivastava et al. |
| 2023/0120049 A1 | 4/2023 | Vangati et al. |
| 2023/0244118 A1 | 8/2023 | Tinianov et al. |
| 2023/0333520 A1 | 10/2023 | Shrivastava et al. |
| 2023/0341740 A1 | 10/2023 | Shrivastava et al. |
| 2023/0393542 A1 | 12/2023 | Shrivastava et al. |
| 2024/0142843 A1 | 5/2024 | Vigano et al. |
| 2024/0171566 A1 | 5/2024 | Vangati et al. |
| 2024/0192563 A1 | 6/2024 | Hur et al. |
| 2024/0201554 A1 | 6/2024 | Tinianov et al. |
| 2024/0220337 A1 | 7/2024 | Shrivastava et al. |
| 2024/0242717 A1 | 7/2024 | Makker et al. |
| 2024/0276204 A1 | 8/2024 | Lee et al. |
| 2024/0284155 A1 | 8/2024 | Lee et al. |
| 2024/0329484 A1 | 10/2024 | Trikha et al. |
| 2025/0004343 A1 | 1/2025 | Shrivastava et al. |
| 2025/0023222 A1 | 1/2025 | Brown et al. |
| 2025/0076828 A1 | 3/2025 | Shrivastava et al. |

FOREIGN PATENT DOCUMENTS

| | | |
|---|---|---|
| CN | 1311935 A | 9/2001 |
| CN | 1599280 A | 3/2005 |
| CN | 1692348 A | 11/2005 |
| CN | 1723658 A | 1/2006 |
| CN | 101128783 A | 2/2008 |
| CN | 101154104 A | 4/2008 |
| CN | 101253460 A | 8/2008 |
| CN | 101501757 A | 8/2009 |
| CN | 101510078 A | 8/2009 |
| CN | 101856193 A | 10/2010 |
| CN | 102325326 A | 1/2012 |
| CN | 102414601 A | 4/2012 |
| CN | 102598469 A | 7/2012 |
| CN | 202443309 U | 9/2012 |
| CN | 103051737 A | 4/2013 |
| CN | 103155330 A | 6/2013 |
| CN | 103168269 A | 6/2013 |
| CN | 203019761 U | 6/2013 |
| CN | 103238107 A | 8/2013 |
| CN | 103282841 A | 9/2013 |
| CN | 103283102 A | 9/2013 |
| CN | 103327126 A | 9/2013 |
| CN | 203204328 U | 9/2013 |
| CN | 103345236 A | 10/2013 |
| CN | 103547965 A | 1/2014 |
| CN | 103649826 A | 3/2014 |

(56) References Cited

FOREIGN PATENT DOCUMENTS

| | | |
|---|---|---|
| CN | 103842735 A | 6/2014 |
| CN | 103987909 A | 8/2014 |
| CN | 104114804 A | 10/2014 |
| CN | 104321497 A | 1/2015 |
| CN | 104335595 A | 2/2015 |
| CN | 104364706 A | 2/2015 |
| CN | 105143586 A | 12/2015 |
| CN | 105431772 A | 3/2016 |
| CN | 105974160 A | 9/2016 |
| CN | 106125444 A | 11/2016 |
| CN | 106164973 A | 11/2016 |
| CN | 205743507 U | 11/2016 |
| CN | 106462023 A | 2/2017 |
| CN | 205992531 U | 3/2017 |
| CN | 106575064 A | 4/2017 |
| CN | 107111287 A | 8/2017 |
| CN | 107850815 A | 3/2018 |
| CN | 108139644 A | 6/2018 |
| EP | 0917667 A1 | 5/1999 |
| EP | 1929701 A2 | 6/2008 |
| EP | 2090961 A1 | 8/2009 |
| EP | 2357544 A2 | 8/2011 |
| EP | 2648086 A2 | 10/2013 |
| EP | 2764998 A1 | 8/2014 |
| EP | 2357544 B1 | 10/2014 |
| EP | 3015915 A1 | 5/2016 |
| EP | 2837205 B1 | 2/2017 |
| EP | 3293941 A1 | 3/2018 |
| EP | 3352053 A1 | 7/2018 |
| EP | 3230943 B1 | 7/2021 |
| FR | 2643512 A1 | 8/1990 |
| JP | H10215492 A | 8/1998 |
| JP | H10246078 A | 9/1998 |
| JP | H11500838 A | 1/1999 |
| JP | 2003284160 A | 10/2003 |
| JP | 2004332350 A | 11/2004 |
| JP | 2006287729 A | 10/2006 |
| JP | 2007156909 A | 6/2007 |
| JP | 4139109 B2 | 8/2008 |
| JP | 2009005116 A | 1/2009 |
| JP | 2010152646 A | 7/2010 |
| JP | 2012017614 A | 1/2012 |
| JP | 2012533060 A | 12/2012 |
| JP | 3184348 U | 6/2013 |
| JP | 2018050290 A | 3/2018 |
| JP | 2018507337 A | 3/2018 |
| JP | 2019508946 A | 3/2019 |
| JP | 2019186771 A | 10/2019 |
| KR | 19990088613 A | 12/1999 |
| KR | 20030040361 A | 5/2003 |
| KR | 20030073121 A | 9/2003 |
| KR | 20070089370 A | 8/2007 |
| KR | 20090066107 A | 6/2009 |
| KR | 20120045915 A | 5/2012 |
| KR | 20120092921 A | 8/2012 |
| KR | 20120117409 A | 10/2012 |
| KR | 20130023668 A | 3/2013 |
| KR | 20130026740 A | 3/2013 |
| KR | 20130112693 A | 10/2013 |
| KR | 101323668 B1 | 11/2013 |
| KR | 101346862 B1 | 1/2014 |
| KR | 20140004175 A | 1/2014 |
| KR | 20150008414 A | 1/2015 |
| KR | 101799323 B1 | 12/2017 |
| KR | 20190142032 A | 12/2019 |
| KR | 20210032133 A | 3/2021 |
| KR | 20210039721 A | 4/2021 |
| RU | 104808 U1 | 5/2011 |
| RU | 2012107324 A | 9/2013 |
| TW | 200532346 A | 10/2005 |
| TW | M368189 U | 11/2009 |
| TW | 201029838 A | 8/2010 |
| TW | 201351010 A | 12/2013 |
| TW | 201447089 A | 12/2014 |
| TW | 201510605 A | 3/2015 |
| TW | M504418 U | 7/2015 |
| TW | 201606409 A | 2/2016 |
| TW | 201635840 A | 10/2016 |
| TW | 1567469 B | 1/2017 |
| TW | I607269 B | 12/2017 |
| WO | WO-0124700 A1 | 4/2001 |
| WO | WO-0237332 A2 | 5/2002 |
| WO | WO-03092309 A1 | 11/2003 |
| WO | WO-2006089718 A2 | 8/2006 |
| WO | WO-2006089718 A3 | 1/2007 |
| WO | WO-2012079159 A1 | 6/2012 |
| WO | WO-2012125332 A2 | 9/2012 |
| WO | WO-2012125348 A2 | 9/2012 |
| WO | WO-2012130262 A1 | 10/2012 |
| WO | WO-2013046112 A1 | 4/2013 |
| WO | WO-2013055457 A1 | 4/2013 |
| WO | WO-2013155467 A1 | 10/2013 |
| WO | WO-2013158365 A1 | 10/2013 |
| WO | WO-2013158464 A1 | 10/2013 |
| WO | WO-2013177575 A1 | 11/2013 |
| WO | WO-2014059268 A2 | 4/2014 |
| WO | WO-2014082092 A1 | 5/2014 |
| WO | WO-2014102198 A1 | 7/2014 |
| WO | WO-2014121809 A1 | 8/2014 |
| WO | WO-2014124701 A1 | 8/2014 |
| WO | WO-2014124710 A1 | 8/2014 |
| WO | WO-2014130471 A1 | 8/2014 |
| WO | WO-2015051262 A1 | 4/2015 |
| WO | WO-2015113592 A1 | 8/2015 |
| WO | WO-2015134789 A1 | 9/2015 |
| WO | WO-2015171886 A1 | 11/2015 |
| WO | WO-2016004109 A1 | 1/2016 |
| WO | WO-2016085964 A1 | 6/2016 |
| WO | WO-2016086017 A1 | 6/2016 |
| WO | WO-2016094445 A1 | 6/2016 |
| WO | WO-2016153467 A1 | 9/2016 |
| WO | WO-2016183059 A1 | 11/2016 |
| WO | WO-2017007841 A1 | 1/2017 |
| WO | WO-2017007942 A1 | 1/2017 |
| WO | WO-2017059362 A1 | 4/2017 |
| WO | WO-2017075059 A1 | 5/2017 |
| WO | WO-2017189618 A1 | 11/2017 |
| WO | WO-2018019473 A1 | 2/2018 |
| WO | WO-2018067377 A1 | 4/2018 |
| WO | WO-2018098089 A1 | 5/2018 |
| WO | WO-2018112095 A2 | 6/2018 |
| WO | WO-2018152249 A1 | 8/2018 |
| WO | WO-2018200702 A1 | 11/2018 |
| WO | WO-2018200740 A2 | 11/2018 |
| WO | WO-2018200752 A1 | 11/2018 |
| WO | WO-2019157602 A1 | 8/2019 |
| WO | WO-2019203931 A1 | 10/2019 |
| WO | WO-2019204205 A1 | 10/2019 |
| WO | WO-2019213441 A1 | 11/2019 |
| WO | WO-2020172187 A1 | 8/2020 |
| WO | WO-2020185941 A1 | 9/2020 |
| WO | WO-2021211798 A1 | 10/2021 |

OTHER PUBLICATIONS

"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
APC by Schneider Electric, Smart-UPS 120V Product Brochure, 2013, 8 pp.
AU Office Action dated Jan. 11, 2022, in Application No. AU2021201145.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Aug. 10, 2020 in AU Application No. 2015360714.

(56) References Cited

OTHER PUBLICATIONS

Australian Office Action dated Aug. 9, 2021 in AU Application No. 2015360714.
Australian Office Action dated Dec. 4, 2020 in AU Application No. 2015360714.
Australian Office Action dated Jun. 4, 2021 in AU Application No. 2015360714.
CA Office Action dated Dec. 13, 2021, in Application No. CA2970300.
CA Office Action dated Dec. 23, 2021, in Application No. CA2941526.
Cecilio, J., et al., "A configurable middleware for processing heterogenous industrial intelligent sensors," IEEE 16th International Conference on Intelligent Engineering Systems (INES), Jun. 15, 2012, pp. 145-149.
Chinese Office Action & Search Report dated Aug. 3, 2020 in CN Application No. 201680060052.5.
Chinese Office Action & Search Report dated Mar. 25, 2021 in CN Application No. 201680060052.5.
CN Office Action dated Dec. 29, 2021, in application No. 202010466929.9.
CN Notice of Allowance with Supplemental Search Report (w/translation) dated Mar. 1, 2021 in CN Application No. 201580040461.4.
CN Office Action dated Aug. 16, 2019 in CN Application No. 201580015979.2.
CN Office Action dated Aug. 28, 2018 in CN Application No. 201580070776.3.
CN Office Action dated Dec. 1, 2021, in application No. CN201780069604 with English translation.
CN Office Action dated Feb. 2, 2019 in CN Application No. 201580015979.2.
CN Office Action dated Feb. 3, 2020 in CN Application No. 201580072749.X.
CN Office Action dated Jan. 15, 2020 in CN Application No. 201580015979.2.
CN Office Action dated Jul. 28, 2021 in CN Application No. 201680060052.5.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 19, 2019 in CN Application No. 201580070776.3.
CN Office Action dated Mar. 8, 2021 in CN Application No. 201580072749.X.
CN Office Action dated Mar. 9, 2020 in CN Application No. 201580040461.4.
CN Office Action dated Nov. 12, 2021, in Application No. CN20158072749 with English translation.
CN Office Action dated Oct. 21, 2020 in CN Application No. 201580040461.4.
CN Office Action dated Oct. 9, 2019 in CN Application No. 201580070776.3.
CN Office Action dated Sep. 28, 2021, in application No. CN201780080267.8 with English translation.
CN Office Action dated Sep. 30, 2020 in CN Application No. 201580072749.X.
"DeviceNet Media—Design and Installation Guide," Rockwell Automation et al., Jul. 2004,XP002384552,https://literature.rockwellautomation.com/idc/groups/literature/documents/um/dnet-um004_-en-p.pdf [retrieved Jun. 9, 2006].
Duchon, Claude E. et al., "Estimating Cloud Type from Pyranometer Observations," Journal of Applied Meteorology, vol. 38, Jan. 1999, pp. 132-141.
EP Examination Report dated Mar. 4, 2019 in EP Application No. 15814233.1.
EP Extended European Search Report mailed on Sep. 14, 2021, in the application EP21182449.7.
EP Extended Search Report dated Dec. 17, 2019 in EP Application No. 19202054.
EP Extended Search Report dated Feb. 15, 2018 in EP Application No. 15814233.1.
EP Extended Search Report dated Jun. 19, 2017 in EP Application No. 15758538.1.
EP Extended Search Report dated Jun. 5, 2018 in EP Application No. 15868003.3.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Office Action dated Jan. 17, 2022, in Application No. 17858928.9.
EP Office Action dated Aug. 21, 2018 in EP Application No. 15758538.1.
EP office action dated Aug. 25, 2021, in EP Application No. EP19202054.3.
EP Office Action dated Feb. 15, 2022, in Application No. EP19188907.0.
EP Office Action dated Jan. 29, 2021 in EP Application No. 15868003.3.
EP Office Action dated May 14, 2020 in EP Application No. 15868003.3.
EP Office Action dated Nov. 19, 2020 in EP Application No. 15758538.1.
EP Search Report dated Dec. 10, 2021, in Application No. EP19787808.5.
European Extended Search Report dated Apr. 18, 2019 in EP Application No. 16847427.8.
European Extended Search Report dated Jul. 3, 2020 in EP Application No. 17875406.5.
European Office Action dated Feb. 25, 2021 in EP Application No. 15863112.7.
European Office Action dated Mar. 4, 2021 in EP Application No. 16847427.8.
IN Office Action dated Jan. 13, 2022, in Application No. 201937044701.
IN Office Action dated Aug. 2, 2021 in IN Application No. 201637028587.
IN Office Action dated Nov. 24, 2020 in IN Application No. 201737020192.
Indian Office Action dated Feb. 24, 2021 in IN Application No. 201737021981.
Indian Office Action dated Feb. 26, 2021 in IN Application No. 201837011989.
International Preliminary Report on Patentability dated Apr. 18, 2019 in PCT Application No. PCT/US17/54120.
International Preliminary Report on Patentability dated Aug. 29, 2019 in PCT Application No. PCT/US2018/018241.
International Preliminary Report on Patentability dated Jan. 12, 2017 in PCT Application No. PCT/US15/38667.
International Preliminary Report on Patentability dated Jun. 13, 2019 in PCT Application No. PCT/US2017/061054.
International Preliminary Report on Patentability dated Jun. 22, 2017 in PCT Application No. PCT/US15/64555.
International Preliminary Report on Patentability dated Jun. 8, 2017 in PCT/US2015/062480.
International Preliminary Report on Patentability dated Mar. 29, 2018 in PCT Application No. PCT/US2016/052211.
International Preliminary Report on Patentability dated Nov. 12, 2020 in PCT Application No. PCT/US2019/030467.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 29, 2020 in PCT/US2019/019455.
International Preliminary Report on Patentability dated Sep. 15, 2016 in Application No. PCT/US2015/019031.
International Search Report and Written Opinion dated Apr. 28, 2020 in PCT Application No. PCT/US2020/018677.

(56) References Cited

OTHER PUBLICATIONS

International Search Report and Written Opinion dated Feb. 15, 2016 in PCT/US2015/062480.
International Search Report and Written Opinion dated Jul. 11, 2019 in PCT Application No. PCT/US2019/030467.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion (ISA/KR) dated Apr. 2, 2018 in PCT Application No. PCT/US2017/061054.
International Search Report and Written Opinion (ISA/KR) dated Dec. 16, 2016 in PCT Application No. PCT/US2016/052211.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
International Search Report and Written Opinion (ISA/KR) dated May 23, 2018 in PCT Application No. PCT/US2018/018241.
JP Examination Report dated Nov. 26, 2020 in JP Application No. 2017-549175.
JP Office Action dated Dec. 7, 2021, in Application No. JP20170549175 with English translation.
JP Office Action dated Jul. 20, 2021 in JP Application No. 2017-549175.
JP Office Action dated Jun. 16, 2020 in JP Application No. 2017-549175.
JP Office Action dated Nov. 19, 2019 in JP Application No. 2017-549175.
JP office action dated Sep. 7, 2021, in JP Application No. 2020-175033.
Kipp & Zonen, "Solar Radiation" (known as of Sep. 3, 2014) [http://www.kippzonen.com/Knowledge-Center/Theoretical-info/Solar-Radiation].
KR Office Action dated Dec. 22, 2021, in Application No. KR1020177018491 with English translation.
KR Office Action dated Jan. 22, 2021 in KR Application No. 10-2016-7025862.
KR Office Action dated Jul. 31, 2021 in KR Application No. 10-2016-7025862.
KR Office Action dated Oct. 26, 2021, in KR Application No. KR1020217028044 with English translation.
NASA Tech Brief "Automated Power-Distribution System,", US Department of Commerce, Springfield, VA, Feb. 1991, p. 128 (2 pp).
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
"Ossia Wireless Charging", screenshot and picture of Cota device, accessed Apr. 20, 2015, 1 page.
Preliminary Amendment dated Jan. 18, 2017 in U.S. Appl. No. 15/123,069.
RU Office Action dated Sep. 24, 2018 in RU Application No. 2016139012.
Russian Office Action dated Jul. 10, 2019 in RU Application No. 2017123902.
Sim, S., "Next generation data interchange: tool-to-tool application programming interfaces," IEEE Working Conference on Reverse Engineering, Nov. 25, 2000, pp. 278-280.
Taiwanese Office Action dated Apr. 27, 2021 in TW Application No. 109138208.
Taiwanese Office Action dated Dec. 12, 2018 in TW Application No. 107129150.
Taiwanese Office Action dated Feb. 27, 2020 in TW Application No. 108126548.
Taiwanese Office Action dated Mar. 23, 2020 in TW Application No. 105130239.
Taiwanese Office Action dated May 13, 2019 in TW Application No. 104139217.
Taiwanese Office Action dated May 21, 2021 in TW Application No. 201833648.
TW Notice of Allowance & Search Report (translated) dated Jul. 30, 2021 in TW Application No. 106133985.
TW Office Action dated Jan. 28, 2022, in Application No. TW107105853.
TW Office Action dated Jan. 28, 2022, in Application No. TW110109128.
TW Office Action dated Nov. 25, 2021, in Application No. TW110141330 with English translation.
US Corrected Notice of Allowability dated Jun. 4, 2020 in U.S. Appl. No. 16/298,776.
US Corrected Notice of Allowability dated May 3, 2021 in U.S. Appl. No. 16/253,971.
US Corrected Notice of Allowability dated Sep. 23, 2021, in U.S. Appl. No. 16/338,403.
US Final Office Action dated Dec. 23, 2020 in U.S. Appl. No. 16/338,403.
US Final Office Action dated Feb. 26, 2015 in U.S. Appl. No. 13/479,137.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2019 in U.S. Appl. No. 15/623,237.
US Final Office Action dated Mar. 15, 2018 in U.S. Appl. No. 14/951,410.
US Final Office Action dated Mar. 17, 2017 in U.S. Appl. No. 14/887,178.
US Final Office Action dated Mar. 18, 2020 in U.S. Appl. No. 16/253,971.
US Final Office Action dated Mar. 3, 2020 in U.S. Appl. No. 16/508,099.
US Final Office Action dated Sep. 19, 2016 in U.S. Appl. No. 14/887,178.
US Non-Final Office action dated Oct. 4, 2021, in U.S. Appl. No. 16/946,140.
U.S. Non-Final Office Action dated Oct. 28, 2021 in U.S. Appl. No. 15/733,765.
U.S. Non-Final Office Action dated Oct. 29, 2021 in U.S. Appl. No. 15/527,554.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
US Notice of Allowance dated Apr. 17, 2019 in U.S. Appl. No. 15/534,175.
US Notice of Allowance dated Apr. 17, 2019 in U.S. Appl. No. 15/910,936.
US Notice of Allowance dated Apr. 26, 2019 for U.S. Appl. No. 15/365,685.
US Notice of Allowance dated Apr. 6, 2020 in U.S. Appl. No. 16/298,776.
US Notice of Allowance dated Apr. 9, 2020 in U.S. Appl. No. 15/123,069.
US Notice of Allowance dated Dec. 13, 2018 in U.S. Appl. No. 15/978,029.
US Notice of Allowance dated Dec. 14, 2018 in U.S. Appl. No. 15/910,936.
US Notice of Allowance dated Dec. 31, 2020 in U.S. Appl. No. 16/523,624.
US Notice of Allowance dated Dec. 31, 2020 in U.S. Appl. No. 16/555,377.

(56) References Cited

OTHER PUBLICATIONS

US Notice of Allowance dated Dec. 7, 2020 in U.S. Appl. No. 16/508,099.
U.S. Notice of Allowance dated Feb. 11, 2022 in U.S. Appl. No. 16/486,113.
U.S. Notice of Allowance dated Feb. 16, 2022 in U.S. Appl. No. 16/664,089.
US Notice of Allowance dated Feb. 24, 2020 for U.S. Appl. No. 16/295,142.
US Notice of Allowance dated Feb. 4, 2021 in U.S. Appl. No. 16/253,971.
US Notice of Allowance dated Jul. 1, 2020 in U.S. Appl. No. 15/623,237.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
US Notice of Allowance dated Jul. 29, 2020 for U.S. Appl. No. 16/439,376.
US Notice of Allowance dated Jun. 14, 2021 in U.S. Appl. No. 16/338,403.
US Notice of Allowance dated Mar. 10, 2021 in U.S. Appl. No. 15/691,468.
US Notice of Allowance dated Mar. 20, 2019 in U.S. Appl. No. 15/320,725.
US Notice of Allowance dated Mar. 26, 2021 in U.S. Appl. No. 16/254,434.
US Notice of Allowance dated Mar. 9, 2018 in U.S. Appl. No. 14/887,178.
US Notice of Allowance dated May 14, 2015 in U.S. Appl. No. 13/479,137.
US Notice of Allowance dated May 14, 2019 in U.S. Appl. No. 15/623,235.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 29, 2018 for U.S. Appl. No. 15/268,204.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.
US Notice of Allowance dated Oct. 22, 2018 in U.S. Appl. No. 14/951,410.
US Notice of Allowance (supplemental) dated Jun. 12, 2015 in U.S. Appl. No. 13/479,137.
US Office Action dated Apr. 27, 2018 in U.S. Appl. No. 15/123,069.
US Office Action dated April 6, 2018 for U.S. Appl. No. 15/268,204.
US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2019 for U.S. Appl. No. 16/295,142.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Mar. 16, 2020 for U.S. Appl. No. 16/439,376.
US Office Action dated Mar. 25, 2016 in U.S. Appl. No. 14/887,178.
US Office Action dated May 6, 2020 in U.S. Appl. No. 15/691,468.
US Office Action dated Nov. 30, 2018 for U.S. Appl. No. 15/365,685.
US Office Action dated Oct. 23, 2017 in U.S. Appl. No. 14/887,178.
US Office Action dated Sep. 11, 2017 in U.S. Appl. No. 14/951,410.
US Office Action dated Sep. 23, 2013 in U.S. Appl. No. 13/479,137.
US Office Action dated Sep. 30, 2020 in U.S. Appl. No. 16/254,434.
US Office Action dated Sep. 4, 2018 in U.S. Appl. No. 15/320,725.
U.S. Appl. No. 16/338,403, inventors Shrivastava et al., filed Mar. 29, 2019.
U.S. Appl. No. 17/083,128, inventors Patterson et al., filed Oct. 28, 2020.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/017946, filed on Feb. 12, 2021.
US Preliminary Amendment dated Dec. 31, 2019 in U.S. Appl. No. 16/608,159.
View Inc., Installation Description, Tintable Electrochromic Windows and an Associated Power Distribution Network, prior to Sep. 2014 (3 pages).
Vinci Construction Datasheet for "Horizon-Solar Connected Window", Dec. 2016 (2 pp).
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
AU Office action dated Sep. 30, 2022, in AU Application No. AU2021215134.
AU Office action dated Apr. 4, 2022, in AU Application No. AU2020226999.
AU Office action dated Mar. 20, 2023, in AU Application No. AU20210215134.
AU Office action dated Oct. 12, 2022, in AU Application No. AU2020226999.
Bannat, A., et al., "Artificial Cognition in Production Systems", IEEE Transactions on Automation Science and Engineering, 2011, vol. 8, No. 1, pp. 148-174.
Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Nov. 9, 2022 in Application No. CA20162998861.
CA Office Action dated Dec. 1, 2022 in Application No. CA2998861.
CA Office Action dated Feb. 22, 2023, in Application No. CA2970300.
CA Office Action dated Jul. 31, 2023, in Application No. CA3156883.
CA Office Action dated Nov. 2, 2023 in CA Application No. CA3045443.
CA Office Action dated Nov. 9, 2023, in CA Application No. 3139813.
CA Office Action dated Oct. 26, 2023, in CA Application No. 3039342.
CA Office Action dated Oct. 31, 2023, in Application No. CA3129952.
CA Office Action dated Sep. 13, 2022, in Application No. CA2970300.
CA Office Action dated Sep. 26, 2023, in Application No. CA2998861.
CA Office Action dated Sep. 28, 2023, in Application No. CA3062817.
Chen, H. et al. "The Design and Implementation of a Smart Building Control System", 2009 IEEE International Conference on e-Business Engineering, pp. 255-262.
CN Office Action dated May 5, 2022, in Application No. CN201780080267.8 With English Translation.
CN Office Action dated Apr. 18, 2022, in Application No. CN202011547257.0 with English translation.

(56) References Cited

OTHER PUBLICATIONS

CN Office Action dated Aug. 1, 2022, in Application No. CN201880037591.6 With English translation.
CN Office Action dated Aug. 19, 2022, in Application No. CN202080022001.X with English translation.
CN Office action dated Aug. 22, 2022 in Application No. CN202011547257.0 With English translation.
CN Office Action dated Aug. 31, 2022 in Application No. CN201780069604.3 with English translation.
CN Office Action dated Feb. 16, 2022, in CN Application No. 201680060052.5 with English Translation.
CN Office Action dated Jan. 10, 2023, in Application No. CN202080022001.X with English translation.
CN Office Action dated Jan. 12, 2023 in CN Application No. CN202011547257 with English translation.
CN Office Action dated Jul. 28, 2023, in Application No. CN201980031543 with English translation.
CN Office Action dated Mar. 16, 2023, in Application No. CN202080022001.X with English translation.
CN Office Action dated Mar. 2, 2022, in Application No. CN201880037591.6 with English translation.
CN Office Action dated Mar. 30, 2023 in Application No. CN201980031543 with English translation.
CN Office Action dated May 17, 2022, in Application No. CN201780069604.3 With English Translation.
CN Office Action dated May 20, 2022, in Application No. CN202010466929.9 with English translation.
CN Office Action dated May 24, 2023, in Application No. CN202080022001.X with English translation.
CN Office Action dated Nov. 1, 2022, in Application No. CN201880037591.6 with English translation.
CN Office Action dated Sep. 28, 2022 in Application No. CN202010466929.9 with English translation.
EP Office Action dated Jul. 13, 2022 in Application No. EP20170858928.
EP Office Action dated Sep. 12, 2022 in Application No. EP20180791117.7.
EP Extended European search report dated Jan. 3, 2023 in Application No. EP22198532.8.
EP Extended European Search report dated Oct. 24, 2023, in Application No. EP23161161.7.
EP Office Action dated Jun. 30, 2022 in Application No. EP20190727174.
EP office action dated Apr. 24, 2023, in application No. EP21182448.7.
EP office action dated Jul. 3, 2023, in application No. EP17858928.9.
EP Office Action dated Jun. 19, 2023 in Application No. EP19727174.5.
EP office action dated Jun. 29, 2023, in application No. EP19787808.5.
EP office action dated Mar. 10, 2023, in application No. EP20712740.8.
European Search Report dated Jul. 20, 2022 in Application No. EP20220164772.
European Office Action dated Apr. 25, 2023 in Application No. EP19188907.
Hadziosmanovic, D., et al., "Through the Eye of the Plc: Semantic Security Monitoring for Industrial Processes," Proceedings of the 30th Annual Computer Security Applications Conference, 2014, pp. 126-135.
Hameed, Z. et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN Office Action dated Feb. 24, 2022 in Application No. IN202135037558.
International Preliminary Report on Patentability dated Mar. 3, 2022, in Application No. PCT/US2020/070427.
International Preliminary Report on Patentability dated Oct. 6, 2022 in PCT Application PCT/US2021/023834.
International Preliminary Report on Patentability dated Oct. 26, 2023, in Application No. PCT/US2022/024812.
International Preliminary Report on Patentability dated Sep. 28, 2023, in PCT Application No. PCT/US2022/020730.
International Search Report and Written Opinion dated Jul. 6, 2022, in PCT Application No. PCT/US2022/020730.
International Search Report and Written Opinion dated Jul. 26, 2022 in Application No. PCT/US2022/024999.
International Search Report and Written Opinion dated Nov. 16, 2022 in PCT Application No. PCT/US2022/074162.
International Search Report and Written Opinion dated Sep. 1, 2022, in Application No. PCT/US2022/024812.
International Search Report and Written Opinion dated Sep. 1, 2022 in Application No. PCT/US2022/028850.
JP Office Action dated Jun. 6, 2023, in application No. JP2022-149815 with English translation.
JP Office Action dated Jun. 6, 2023, in Application No. JP2020-560912 with English translation.
JP Office Action dated Mar. 1, 2022, in Application No. JP2020-175033 with translation.
JP office action dated Sep. 7, 2021, in JP Application No. 2020-175033 with English translation.
KR Office Action dated Apr. 13, 2022, in KR Application No. KR1020217028044 with English translation.
KR Office Action dated Apr. 25, 2023, in Application No. KR10-2017-7017128 with English translation.
KR Office Action dated Dec. 7, 2022 in Application No. KR10-2022-7036992 with English translation.
KR Office Action dated Jul. 10, 2023, in application No. KR 10-2023-7021596 with English Translation.
KR Office Action dated Jul. 17, 2023, in Application No. KR10-2018-7009624 with English translation.
KR Office Action dated Jul. 26, 2023, in Application No. KR10-2022-7037562 with English translation.
KR Office Action dated May 12, 2023, in Application No. KR10-2022-7027386 with English translation.
KR Office Action dated Nov. 3, 2022, in Application No. KR10-2022-7027386 withEnglish Translation.
KR Office Action dated Sep. 25, 2023, in Application No. KR10-2022-7027386 with English Translation.
Laskar, S.H., et al., "Power Quality Monitoring by Virtual Instrumentation using LabVIEW", 2011 46th International Universities' Power Engineering Conference (UPEC), 2011, pp. 1-6.
Mumaw, R.J et al., "There is More to Monitoring a Nuclear Power Plant Than Meets the Eye", Human factors, 2000, vol. 42, No. 1, pp. 36-55.
Tuokko, R., et al., "Micro and Desktop Factory Road Map", Tampere University of Technology, 2012, pp. 1-114.
TW Office Action dated Jun. 6, 2022 in Application No. TW108115291 With English Translation.
TW Office Action dated Apr. 27, 2023, in application No. TW20220142122 with English translation.
TW Office Action dated Apr. 29, 2022, in Application No. TW110140314 with English translation.
TW Office Action dated Jan. 12, 2023 in Application No. TW108115291 with English translation.
TW Office Action dated Jan. 18, 2022, in Application No. TW110148618 with English translation.
TW office action dated Jan. 28, 2022, in Application No. TW107105853 with English Translation.
TW Office Action dated Jan. 28, 2022, in Application No. TW110109128 with English translation.
TW Office Action dated Jul. 7, 2023, in application No. TW112106324 with English translation.
TW Office Action dated Jul. 17, 2023, in application No. TW112106385 with English translation.
TW Office Action dated Jul. 28, 2022, in Application No. TW111124754 with English translation.
TW Office Action dated Jun. 17, 2023, in application No. TW107114217 with English translation.

(56) References Cited

OTHER PUBLICATIONS

TW Office Action dated Mar. 15, 2022, in Application No. TW109112242 with Englishtranslation.
TW Office Action dated Nov. 23, 2022 in Application No. TW107114217 with English translation.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S. Notice of Allowance dated Sep. 8, 2022 in U.S. Appl. No. 16/946,140.
U.S Advisory Action dated Aug. 23, 2023 in U.S. Appl. No. 17/194,795.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
U.S. Corrected Notice of Allowance dated Apr. 28, 2022, in U.S. Appl. No. 15/733,765.
U.S. Corrected Notice of Allowance dated Dec. 21, 2022 in U.S. Appl. No. 16/946,140.
U.S. Corrected Notice of Allowance dated Feb. 28, 2022 in U.S. Appl. No. 16/486,113.
U.S. Corrected Notice of Allowance dated Jul. 17, 2023, in U.S. Appl. No. 17/301,026.
U.S. Corrected Notice of Allowance dated Jun. 12, 2023, in U.S. Appl. No. 17/453,469.
U.S. Corrected Notice of Allowance dated May 26, 2023 in U.S. Appl. No. 17/355,086.
U.S. Corrected Notice of Allowance dated Oct. 31, 2023, in U.S. Appl. No. 17/453,469.
U.S. Final office Action dated May 19, 2023 in U.S. Appl. No. 17/194,795.
U.S. Final Office Action dated Nov. 15, 2023 in U.S. Appl. No. 17/609,671.
U.S. Non Final office action dated Mar. 30, 2022, in U.S. Appl. No. 16/946,140.
U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Apr. 18, 2023 in U.S. Appl. No. 17/609,671.
U.S. Non-Final Office Action dated Aug. 12, 2022 in U.S. Appl. No. 16/655,032.
U.S. Non-Final Office Action dated Aug. 31, 2023, in U.S. Appl. No. 17/194,795.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-Final Office Action dated Jul. 20, 2023, in U.S. Appl. No. 17/804,802.
U.S. Non-final Office Action dated Jul. 28, 2022 in U.S. Appl. No. 16/655,032.
U.S. Non-Final office Action dated Mar. 9, 2023 in U.S. Appl. No. 17/909,925.
U.S. Non-Final Office Action dated Nov. 16, 2023 in U.S. Appl. No. 17/194,795.
U.S. Non-Final Office Action dated Oct. 24, 2022, in U.S. Appl. No. 17/486,716.
U.S. Non-Final Office Action dated Sep. 29, 2023, in U.S. Appl. No. 17/989,603.
U.S. Notice of Allowance dated Apr. 24, 2023 in U.S. Appl. No. 17/721,187.
U.S. Notice of Allowance dated Apr. 6, 2022, in U.S. Appl. No. 15/733,765.
U.S. Notice of Allowance dated Aug. 3, 2023, in U.S. Appl. No. 17/869,725.
U.S. Notice of Allowance dated Aug. 10, 2023 in U.S. Appl. No. 17/301,026.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
U.S. Notice of Allowance dated Dec. 29, 2022 in U.S. Appl. No. 16/655,032.
U.S. Notice of Allowance dated Feb. 1, 2023 in U.S. Appl. No. 17/721,187.
U.S. Notice of Allowance dated Feb. 7, 2023 in U.S. Appl. No. 17/249,442.
U.S. Notice of Allowance dated Feb. 14, 2023 in U.S. Appl. No. 17/355,086.
U.S. Notice of Allowance dated Jul. 6, 2023 in U.S. Appl. No. 17/870,480.
U.S. Notice of Allowance dated Jul. 13, 2023 in U.S. Appl. No. 17/940,951.
U.S. Notice of Allowance dated Jun. 7, 2023 in U.S. Appl. No. 17/453,469.
U.S. Notice of Allowance dated Jun. 7, 2023 in U.S. Appl. No. 17/870,480.
U.S Notice of Allowance dated Jun. 8, 2022 in U.S. Appl. No. 15/733,765.
U.S. Notice of Allowance dated Jun. 12, 2023, in U.S. Appl. No. 17/940,951.
U.S. Notice of Allowance dated Jun. 16, 2023, in U.S. Appl. No. 17/301,026.
U.S. Notice of Allowance dated Jun. 20, 2022 in U.S. Appl. No. 16/527,554.
U.S. Notice of Allowance dated Mar. 31, 2023 in U.S. Appl. No. 17/249,442.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 26, 2023 in U.S. Appl. No. 17/453,469.
U.S. Notice of Allowance dated Sep. 20, 2023, in U.S. Appl. No. 17/453,469.
U.S. Appl. No. 17/989,603, Inventors Shrivastava et al., filed Nov. 17, 2022.
U.S. Appl. No. 18/237,146, inventors Shrivastava D, et al., filed Aug. 23, 2023.
U.S. Appl. No. 18/281,913 inventors Trikha N, et al., filed Sep. 13, 2023.
U.S. Appl. No. 18/555,129, inventors Makker T, et al., filed Oct. 12, 2023.
U.S. Appl. No. 18/555,275, inventors Hur Yerang et al., filed Oct. 13, 2023.
U.S. Supplemental Notice of Allowance dated Aug. 1, 2022 in U.S. Appl. No. 17/171,667.
Woods, D ., "The Alarm Problem and Directed Attention in Dynamic Fault Management.", Ergonomics, 1995, vol. 38, No. 11, pp. 2371-2393.
CA Office Action dated Dec. 5, 2023 in Application No. 2970300.
CA Office Action dated Dec. 27, 2023 in CA Application No. 3172227.
CN Office Action dated Apr. 11, 2024 in CN Application No. 201980003232.3 with English translation.
CN Office Action dated Dec. 12, 2023 in CN Application No. 201980003232.3, withEnglish Translation.
EP Extended European Search report dated Mar. 4, 2024 in EP Application No. 23187299.5.
EP Extended European Search report dated Mar. 6, 2024 in EP Application No. 23214710.8.

(56) References Cited

OTHER PUBLICATIONS

EP Extended European Search Report dated May 28, 2024 in EP Application No. 21775725.1.
EP Office Action dated Feb. 21, 2024 in EP Application No. 20729442.2.
EP Office Action dated Jul. 2, 2024 in EP Application No. 19188907.0.
EP Partial Supplementary European Search report dated Mar. 6, 2024, in EP Application No. 21775725.1.
International Preliminary Report on Patentability and Written Opinion dated Feb. 8, 2024 in PCT Application No. PCT/US2022/074162.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
JP Office Action dated Feb. 13, 2024 in JP Application No. 2020-560912, with EnglishTranslation.
JP Office Action dated Jun. 11, 2024 in JP Application No. 2021-564914, with EnglishTranslation.
U.S. Advisory Action dated Aug. 22, 2024 in U.S. Appl. No. 17/194,795.
U.S. Corrected Notice of Allowance dated Aug. 5, 2024 in U.S. Appl. No. 18/310,443.
U.S. Corrected Notice of Allowance dated Dec. 4, 2023 in U.S. Appl. No. 17/453,469.
U.S. Final Office Action dated May 8, 2024 in U.S. Appl. No. 17/194,795.
U.S. Non-Final Office Action dated Apr. 24, 2024 in U.S. Appl. No. 18/237,146.
U.S. Non-Final Office Action dated Aug. 28, 2024 in U.S. Appl. No. 18/428,413.
U.S. Non-Final Office Action dated Dec. 15, 2023 in U.S. Appl. No. 16/949,800.
U.S. Non-Final Office Action dated Dec. 28, 2023 in U.S. Appl. No. 18/310,443.
U.S. Non-Final Office Action dated Feb. 23, 2024 in U.S. Appl. No. 17/313,760.
U.S. Non-Final Office Action dated Jan. 24, 2024 in U.S. Appl. No. 17/609,671.
U.S. Non-Final Office Action dated Jul. 16, 2024 in U.S. Appl. No. 18/513,707.
U.S. Non-Final Office Action dated Jun. 12, 2024 in U.S. Appl. No. 17/300,303.
U.S. Notice of Allowance dated Dec. 12, 2023 in U.S. Appl. No. 17/486,716.
U.S. Notice of Allowance dated Dec. 13, 2023 in U.S. Appl. No. 17/453,469.
U.S. Notice of Allowance dated Dec. 21, 2023 in U.S. Appl. No. 17/909,925.
U.S. Notice of Allowance dated Feb. 5, 2024 in U.S. Appl. No. 18/131,682.
U.S. Notice of Allowance dated Feb. 14, 2024 in U.S. Appl. No. 17/989,603.
U.S. Notice of Allowance dated Feb. 14, 2024 in U.S. Appl. No. 18/131,682.
U.S. Notice of Allowance dated Feb. 28, 2024 in U.S. Appl. No. 17/989,603.
U.S. Notice of Allowance dated Jan. 8, 2024 in U.S. Appl. No. 17/989,603.
U.S. Notice of Allowance dated Mar. 22, 2024 in U.S. Appl. No. 16/949,800.
U.S. Notice of Allowance dated May 1, 2024 in U.S. Appl. No. 18/310,443.
U.S. Notice of Allowance dated May 10, 2024 in U.S. Appl. No. 17/609,671.
U.S. Notice of Allowance dated May 23, 2024 in U.S. Appl. No. 17/609,671.
U.S. Appl. No. 18/764,727, inventors Shrivastava D, et al., filed Jul. 5, 2024.
U.S. Appl. No. 18/797,037, inventors Brown S.C, et al., filed Aug. 7, 2024.
Zheng, Z., et al., "Subscription to Multiple Stream Originators, Draft-zhou-netconf-multi-stream-originators-10," Internet Engineering Task Force, 2019, vol. 6, pp. 1-21.
CN Office Action dated Jan. 24, 2025 in CN Application No. 201680060052.5 with English translation.
U.S. Final Office Action dated Feb. 7, 2025 in U.S. Appl. No. 17/679,027.
U.S. Final Office Action dated Feb. 24, 2025 in U.S. Appl. No. 18/555,129.
U.S. Restriction Requirement dated Feb. 13, 2025 in U.S. Appl. No. 17/904,156.
CN Board Opinion dated Sep. 23, 2024 in CN Application No. 202080022001.X with English translation.
CN Office Action dated Sep. 25, 2024 in CN Application No. 201980003232.3 with English translation.
KR Office Action dated Aug. 28, 2024 in KR Application No. 10-2021-7040307, with English Translation.
Lee E., et al., "The Design and Evaluation of Integrated Envelope and Lighting Control Strategies for Commercial Buildings," Energy & Environment division, 1994, pp. 1-23.
U.S. Corrected Notice of Allowance dated Oct. 28, 2024 in U.S. Appl. No. 18/237,146.
U.S. Non-Final Office Action dated Sep. 24, 2024 in U.S. Appl. No. 17/679,027.
U.S. Non-Final Office Action dated Sep. 26, 2024 in U.S. Appl. No. 18/555,129.
U.S. Notice of Allowance dated Oct. 17, 2024 in U.S. Appl. No. 18/237,146.
U.S. Notice of Allowance dated Sep. 11, 2024 in U.S. Appl. No. 17/194,795.
U.S. Notice of Allowance dated Sep. 12, 2024 in U.S. Appl. No. 18/213,843.
U.S. Appl. No. 18/898,810, inventors Shrivastava D, et al., filed Sep. 27, 2024.
U.S. Appl. No. 18/905,745, inventor Khanna N, filed Oct. 3, 2024.
U.S. Appl. No. 18/930,277, inventors Shrivastava D, et al., filed Oct. 29, 2024.
CN Office Action dated Jan. 16, 2025 in CN Application No. 202080022001.X, with English Translation.
EP Office Action dated Nov. 28, 2024 in EP Application No. 20712740.8.
U.S. Non-Final Office Action dated Dec. 12, 2024 in U.S. Appl. No. 17/666,355.
U.S. Notice of Allowance dated Dec. 10, 2024 in U.S. Appl. No. 18/589,033.
U.S. Notice of Allowance dated Jan. 31, 2025 in U.S. Appl. No. 18/428,413.
U.S. Appl. No. 18/974,016, inventors Vangati M.R et al., filed Dec. 9, 2024.
U.S. Appl. No. 18/986,170, inventors Trikha N et al., filed Dec. 18, 2024.
U.S. Appl. No. 19/021,467, inventors Tinianov B.D et al., filed Jan. 15, 2025.
EP Office Action dated Mar. 5, 2025 in EP Application No. 18791117.7.
U.S. Appl. No. 19/058,574, inventors Shrivastava D et al., filed Feb. 20, 2025.

* cited by examiner

TRUNK LINE WINDOW CONTROLLERS

CROSS REFERENCE TO RELATED APPLICATIONS

This application claims benefit of priority to U.S. Provisional Patent Application No. 62/890,554, titled "TRUNK LINE WINDOW CONTROLLERS," and filed Aug. 22, 2019. This application is also a continuation-in-part of and claims priority to PCT Application No. US2019/019455, titled "TRUNK LINE WINDOW CONTROLLERS," and filed Feb. 25, 2019, which claims benefit of priority to the following U.S. Provisional Patent Applications: U.S. Provisional Patent Application No. 62/660,170, titled "TRUNK LINE WINDOW CONTROLLERS," and filed Apr. 19, 2018; U.S. Provisional Patent Application No. 62/687,187, titled "TESTER FOR POWER LINE CONNECTOR," filed Jun. 19, 2018; and U.S. Provisional Patent Application No. 62/696,704, titled "TRUNK LINE WINDOW CONTROLLERS," filed Jul. 11, 2018. This application is also a continuation-in-part of and claims priority to U.S. patent application Ser. No. 16/946,140, titled "POWER DISTRIBUTION AND COMMUNICATIONS SYSTEM FOR ELECTROCHROMIC DEVICES," and filed Jun. 8, 2020, which is a continuation of U.S. patent application Ser. No. 16/295,142 (now issued as U.S. Pat. No. 10,704,322), which is a continuation of U.S. patent application Ser. No. 15/268,204 (now issued as U.S. Pat. No. 10,253,558), which claims benefit of priority to U.S. Provisional Patent Application No. 62/220,514, titled "POWER DISTRIBUTION NETWORKS FOR ELECTROCHROMIC DEVICES," and filed on Sep. 18, 2015. Each of the applications and patents mentioned in this section is herein incorporated by reference in its entirety and for all purposes.

FIELD

The disclosed embodiments relate generally to optically switchable devices, more particularly to a network of connected optically switchable windows and connectors for testing and troubleshooting the network.

BACKGROUND

During commissioning of a network of electrically connected windows, testing for proper operation of a network is performed. If improper operation or connectivity of the network is found, troubleshooting is performed. However, testing and troubleshooting in the past has been made difficult by the location of, and the distance between, connections and components in the electrical network. For example, in a daisy chain of 8 windows connected to a trunk line 60 feet long, connectors used to connect drop lines to the windows, via their corresponding window controllers, can potentially be separated by up to 60 feet, which distance between connectors can make it difficult for technicians to verify electrical connectivity and continuity and the presence of signals along the trunk line at and between the connectors. Testing and troubleshooting is made even more difficult when the trunk line is in a hard to reach location in a ceiling or wall.

SUMMARY

In one aspect, the present disclosure includes a system for communicating with optically switchable windows in a building, the system includes: a trunk line configured to provide a communication path to a plurality of optically switchable windows, the trunk line including a plurality of trunk line segments, each including a plurality of electrical conductors; a plurality of window controllers, each configured to couple to a respective one of the optically switchable windows; and a plurality of electrical connector blocks, where each electrical connector block includes at least one of the window controllers, and where the electrical connector blocks are configured to be connected in series by the plurality of trunk line segments.

In various embodiments, each of the plurality of electrical connector blocks includes a plurality of the window controllers. In some embodiments, the plurality of electrical connector blocks are configured to provide access to the plurality of conductors while connected in series with the plurality of trunk line segments. In some embodiments, each of the plurality of electrical connector blocks is integrally formed with at least one of the plurality of window controllers. In some embodiments, each of the plurality of electrical connector blocks is formed around at least one of the plurality of window controllers. In some embodiments, the plurality of window controllers is configured to be removable without removal of an electrical connector block from the trunk line. In some embodiments, the plurality of electrical connector blocks are coupled to the trunk line via threads. In some embodiments, the plurality of electrical conductors are continuous between the ends of the trunk line. In some embodiments, the plurality of electrical connector blocks are snapped over or clamped to the trunk line. In some embodiments, the trunk line includes at least one flat or ribbon portion. In some embodiments, the plurality of electrical connector blocks are defined by a body within or on which a plurality of test points are disposed. In some embodiments, the plurality of electrical connectors are defined by a body from which the plurality of test points extend. In some embodiments, at least one of the plurality of test points is embodied as a drop line. In some embodiments, the plurality of optically switchable windows include electrochromic windows.

Another aspect of this disclosure pertains to a system for communicating with optically switchable windows in a building, the system including: a trunk line including: a plurality of trunk line segments, each including a plurality of electrical conductors, a plurality of electrical connector blocks connected in series by the plurality of trunk line segments, and a plurality of window controllers, where at least one of the window controllers is provided as part of at least one of the plurality of electrical connector blocks; and a plurality of drop lines configured to communicate data and/or power between the trunk line and the optically switchable windows. This system may include any one or more of the features described above in this section or otherwise described herein.

Another aspect of this disclosure pertains to a trunk line for providing data and/or power to optically switchable windows in a building, the trunk line including: a plurality of trunk line segments, each including a plurality of electrical conductors; a plurality of electrical connector blocks connected in series by the plurality of trunk line segments, where at least some of the electrical connector blocks are configured to connect with drop lines for providing data and/or power between the trunk line and the optically switchable windows; and a plurality of window controllers, where each electrical connector block includes at least one of the plurality of window controllers. This trunk line may include any one or more of the features described above in this section or otherwise described herein.

Another aspect of this disclosure pertains to a system for communicating with optically switchable windows in a building, the system including: a communication network configured to provide a data communication path from a master controller to a plurality of optically switchable windows disposed at a plurality of locations on or in the building, the data communication path including: a trunk line including a plurality of electrical conductors; a plurality of window controllers; a plurality of electrical connector blocks conductively coupled to the trunk line, where each of the electrical connector blocks includes at least one of the plurality of window controllers; and a plurality of drop lines coupled to each of the plurality of electrical connector blocks, where each of the plurality of optically switchable windows is connected to the trunk line by one of the plurality of drop lines.

In some embodiments, the trunk line includes trunk line segments coupled by the plurality of electrical connector blocks. In some embodiments, the plurality of electrical connector blocks are coupled to the trunk line via threads. In some embodiments, the plurality of electrical conductors are continuous from end to end. In some embodiments, the plurality of electrical connector blocks are snapped over or clamped to the trunk line. In some embodiments, the trunk line includes at least one flat or ribbon portion. In some embodiments, at least one of the plurality of electrical connector blocks includes a body within or on which test points configured to be accessed by a tester are disposed. In some embodiments, at least one of the plurality of electrical connector blocks include a body from which test points configured to be accessed by a tester extend. In some embodiments, the plurality of optically switchable windows includes electrochromic windows.

These and other features and advantages will be described in further detail below, with reference to the associated drawings.

FIGURES

The following detailed description can be more fully understood when considered in conjunction with the drawings in which.

Figure 11A:
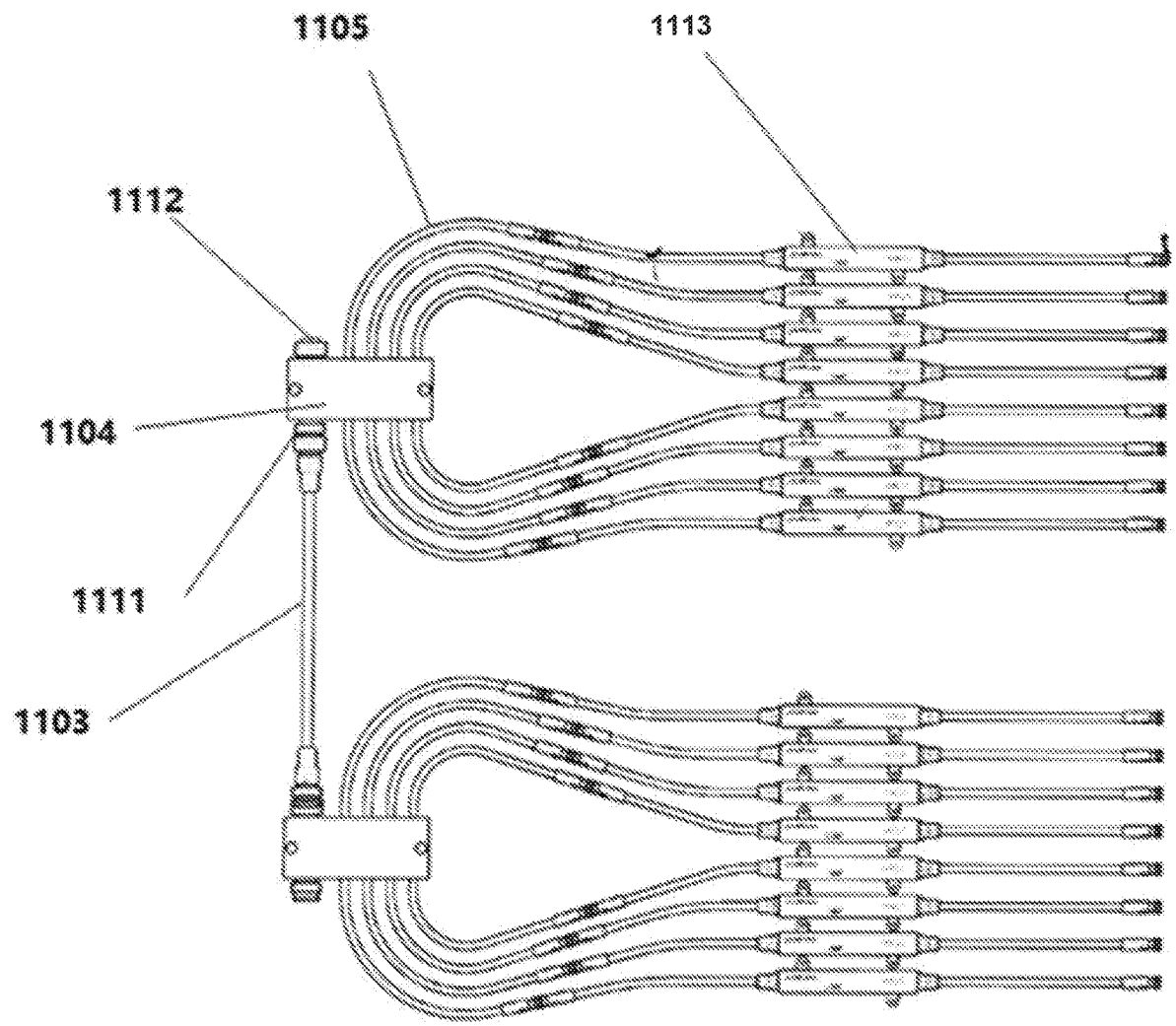
Figure 11B:
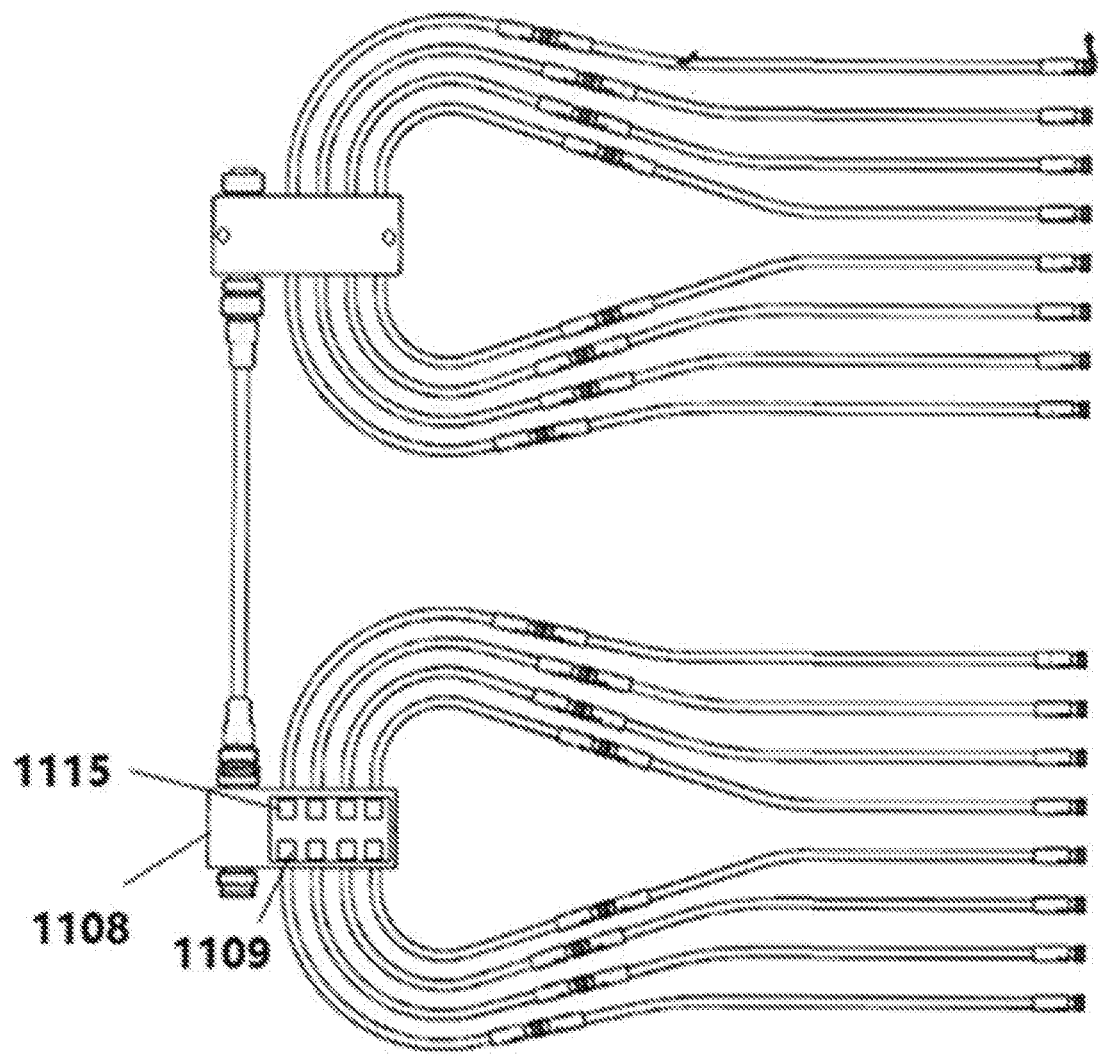
Figure 12:
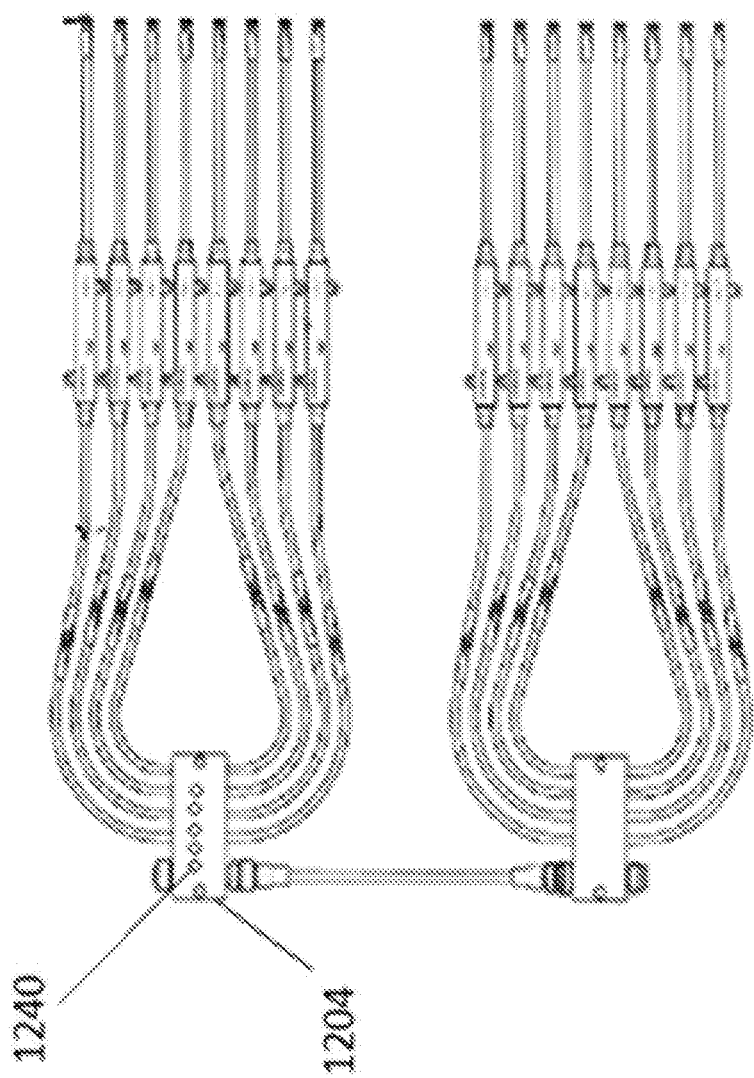

FIGS. 11A, 11B, and 12 depict connector blocks consistent with embodiments described herein.

FIGS. 13A, 13B, and 14-16 depict a tester consistent with embodiments described herein.

Figure 17:
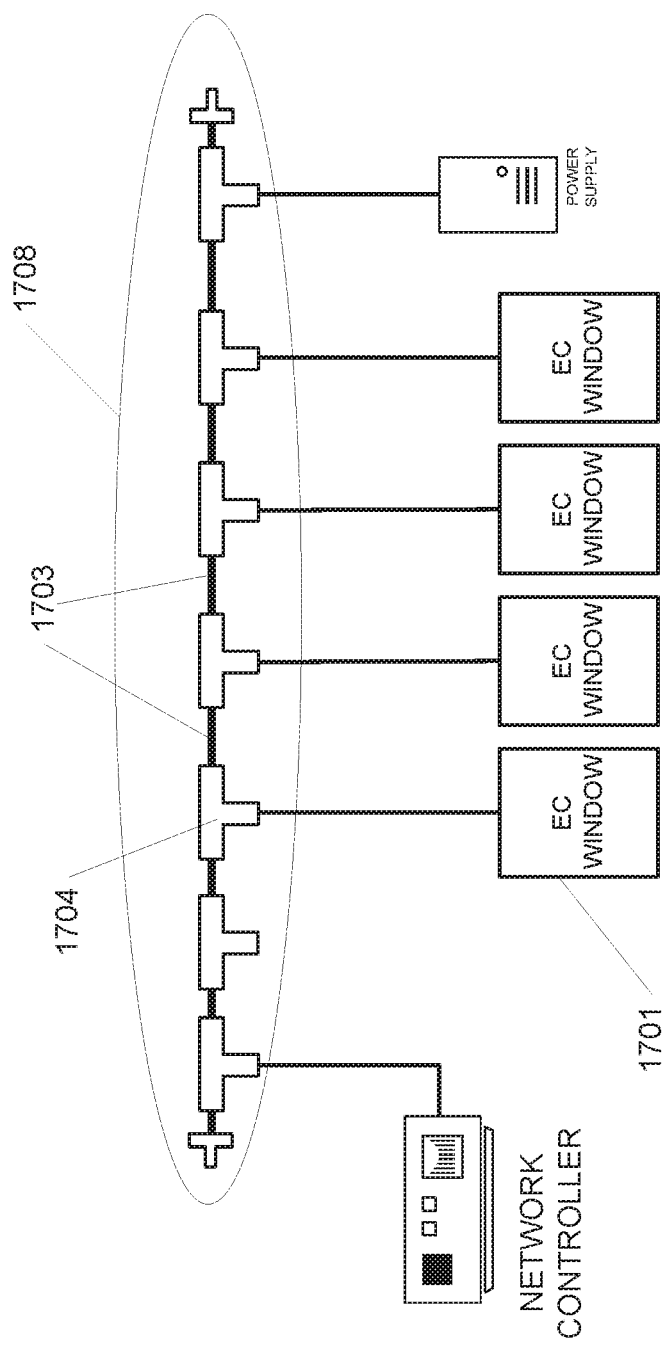

FIG. 17 depicts a trunk line comprised of connectors comprised of window controllers.

Figure 18:
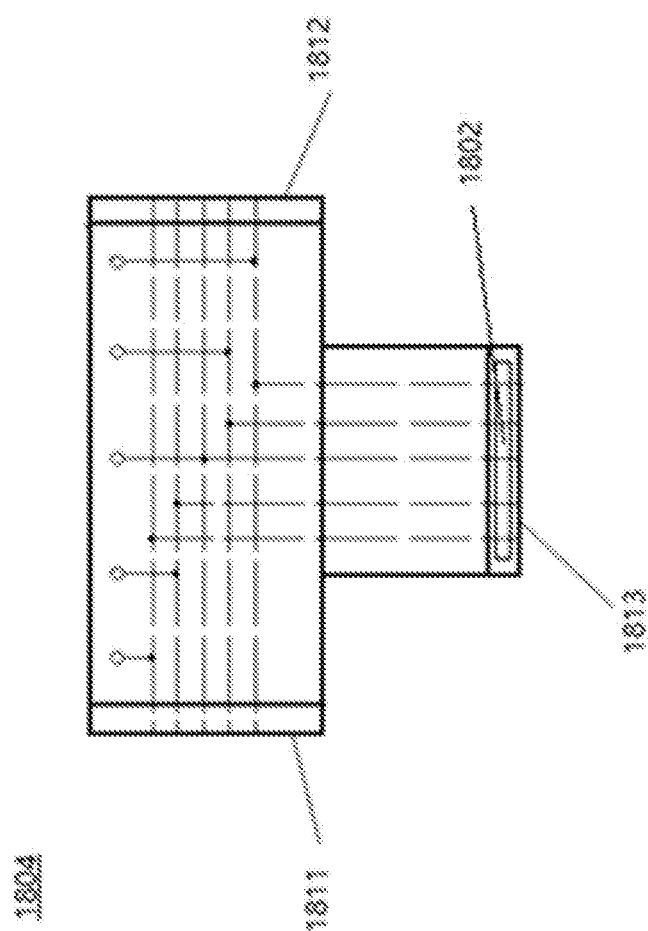

FIG. 18 depicts a connector comprised of a window controller.

Figure 19:
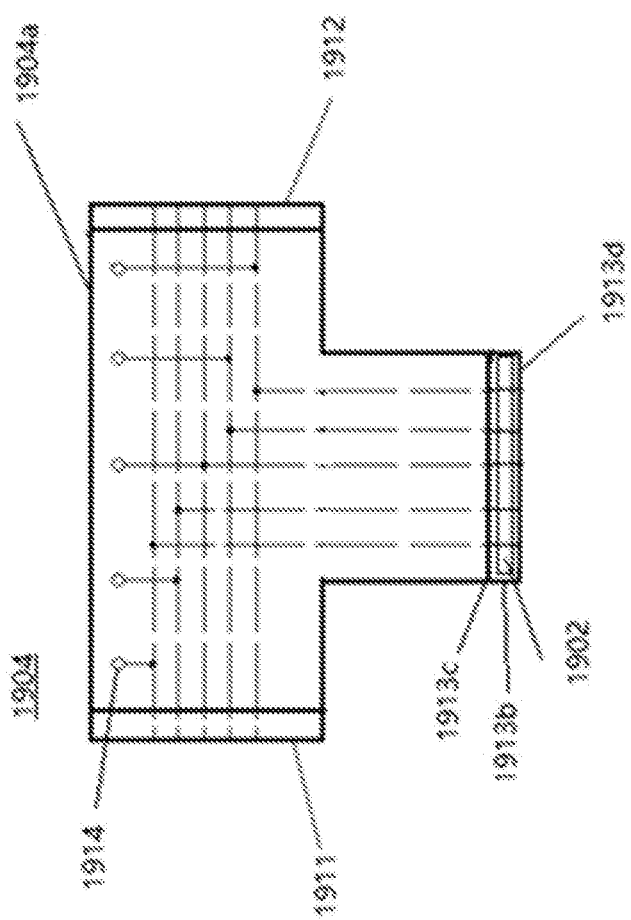

FIG. 19 depicts another embodiment of a connector comprised of a window controller.

DETAILED DESCRIPTION

A "localized" controller, as described herein, is a window controller that is associated with, and controls, one or more optically switchable windows, such as electrochromic or "EC" windows. An EC window may include one, two, three or more individual EC panes (an EC device on a transparent substrate). The controller may be configured in close proximity to the EC window, as part of the EC window, or at a distance from the EC window. In certain embodiments, this means that the controller is, for example, within 1 meter of the EC window when controller is installed, in one embodiment, within 0.5 meter, in yet another embodiment, within 0.25 meter. In some embodiments, the window controller is an "in situ" controller; that is, the controller is part of a window assembly, which includes an IGU having one or more EC panes, and thus does not have to be matched with the EC window, and installed, in the field. The controller may be installed in the window frame of a window unit, or be part of the IGU, for example, mounted between panes of the IGU.

It should be understood that while the disclosed embodiments focus on electrochromic windows, the concepts may apply to other types of switchable optical devices such as liquid crystal devices, suspended particle devices and the like.

The window controllers described herein have a number of advantages because they are matched to an insulated glass unit ("IGU") containing one or more EC devices. In one embodiment, the controller is incorporated into the IGU and/or the window frame prior to installation of the EC window. In one embodiment, the controller is incorporated into the IGU and/or the window frame prior to leaving the manufacturing facility. In one embodiment, the controller is incorporated into the IGU, substantially within the secondary seal. Having the controller as part of an IGU and/or a window assembly, the IGU can be characterized using logic and features of the controller that travels with the IGU or window unit. For example, when a controller is part of the IGU assembly, in the event the characteristics of the EC device(s) change over time, this characterization function can be used, for example, to redirect into which product the IGU will be incorporated. In another example, if already installed in an EC window unit, the logic and features of the controller can be used to calibrate the control parameters to match the intended installation, and for example if already installed, the control parameters can be recalibrated to match the performance characteristics of the EC pane(s).

In this application, an "IGU" includes two substantially transparent substrates, for example, two panes of glass, where at least one substrate includes an EC device disposed thereon, and the panes have a separator disposed between them. An IGU is typically hermetically sealed, having an interior region that is isolated from the ambient environment. A "window assembly" includes an IGU, and may include electrical leads for connecting the IGU's one or more EC devices to a voltage source, switches and the like, as well as a frame that supports the IGU and related wiring.

Figure 1A:
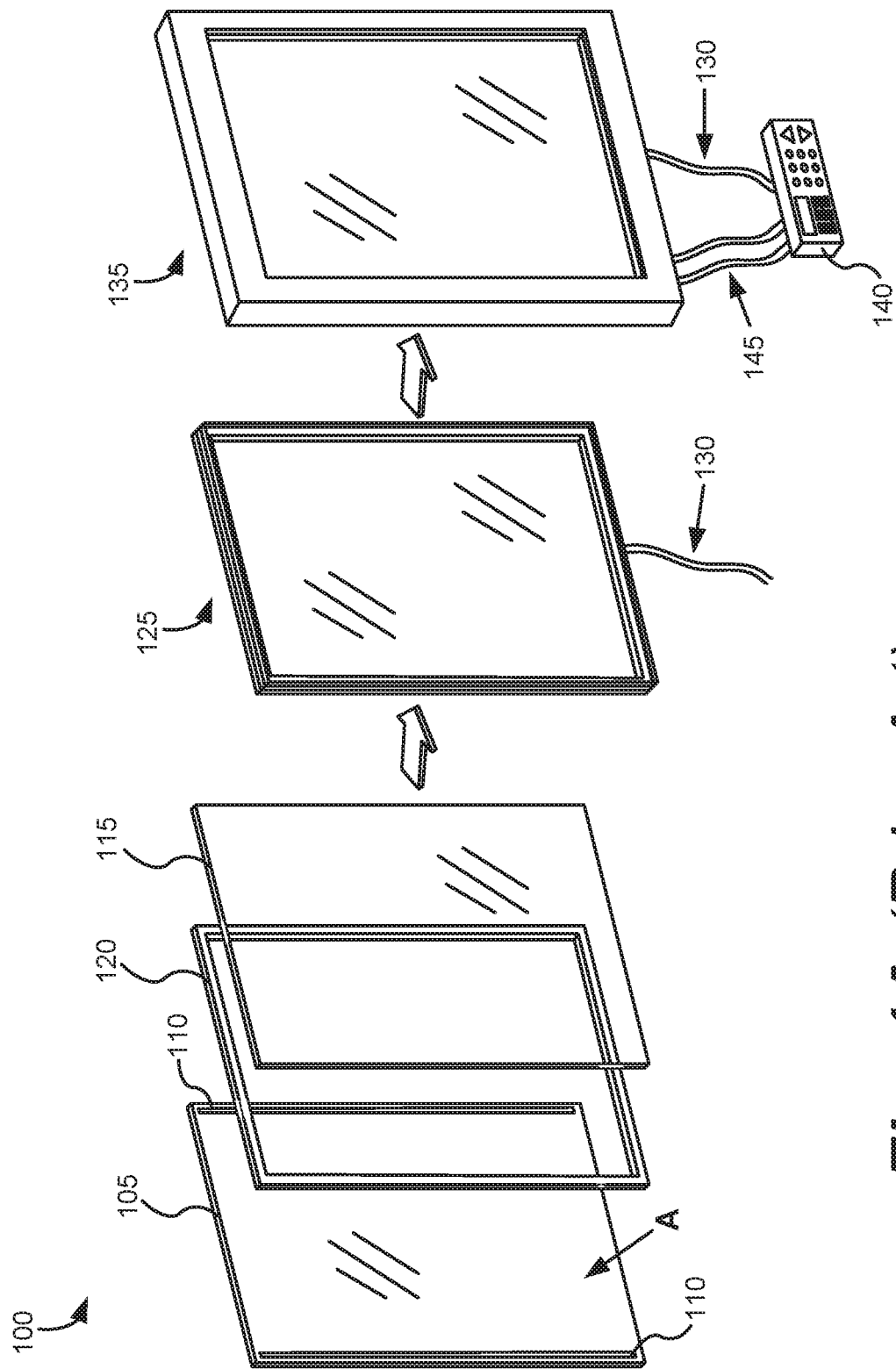
FIG. 1A depicts conventional fabrication of an IGU including an EC pane and incorporation into a window assembly.

For context, a discussion of conventional window controller technology follows. FIG. 1A depicts an EC window fabrication and control scheme, 100. An EC pane, 105, having an EC device (not shown, but for example on surface A) and bus bars, 110, which power the EC device, is matched with another glass pane, 115. During fabrication of IGU, 125, a separator, 120, is sandwiched in between and registered with substrates 105 and 115. The IGU 125 has an associated interior space defined by the faces of the substrates in contact with separator 120 and the interior surfaces of the separator. Separator 110 is typically a sealing separator, that is, includes a spacer and sealing between the spacer and each substrate where they adjoin in order to hermetically seal the interior region and thus protect the interior from moisture and the like. Typically, once the glass panes are sealed to the separator, secondary sealing may be applied around the perimeter edges of the IGU in order to impart further sealing from the ambient, as well as further structural rigidity to the IGU. The IGU 125 must be wired to a controller via wires, 130. The IGU is supported by a frame to create a window assembly, 135. Window assembly 135 is connected, via wires 130, to a controller, 140. Controller 140 may also be connected to one or more sensors in the frame via communication lines 145.

As depicted in FIG. 1A, conventional EC window controllers are not part of the window assembly itself and thus it is required that the controllers are installed outside of the IGU and/or window assembly. Also, conventional window controllers are calibrated to the EC window they control at the installation site, putting more burden on the installer. Consequently, there are more parts to ship from the manufacturer to the installation site, and this has associated tracking pitfalls, for example, mismatching of window and associated controller. Mismatched controller and window can cause installation delays as well as damage to the controller and/or IGU. All these factors contribute to higher cost of EC windows. Also, since conventional controllers are remotely located, long and differing lengths of low voltage (e.g. less than 10 v DC) wiring and thus are wired to one or more EC windows as part of the installation of the EC windows. For example, referring to FIG. 1B, controllers 140 each control an EC window 135. Typically the controllers are located proximate to a single location and so low voltage wiring 130 is of varying length. This is true even if there is only one controller that controls multiple windows. There are associated current drop offs and losses due to this long wiring. Also, since the controller is located remotely, any control feedback or diagnostic sensors mounted in the window assembly require separate wiring to be run to the controller-increasing cost and complexity of installation. Also, any identification numbers on the IGU are hidden by the frame and may not be easily accessible, which makes it problematic to check IGU information, for example, checking warranty or other vendor information.

In one embodiment, localized controllers are installed as part of the wall of the room in which the associated window's or IGU's will be installed. That is, the controllers are installed in the framing and/or wall materials proximate (according to the distances described herein) to where their associated window units or IGU's will be installed. This may be in materials that will ultimately be part of the wall, where a separate window frame and IGU (a window unit) is to be installed, or the controller may be installed in framing materials that will serve, at least partially, as the frame for the EC window, where the IGUs are installed into the framing to complete an IGU and controller proximity matching. Thus, one embodiment is a method of installing an EC window and associated controller unit into a wall, the method including (a) installing the associated controller unit into a wall, and (b) installing either an EC window unit which includes a window frame of the EC window, or installing an IGU, where the wall framing serves as the frame for the EC window.

In one embodiment, controllers described herein are part of a window assembly. One embodiment is a window unit including: a substantially transparent substrate having an electrochromic device disposed thereon; and a controller integrated with the substrate in the window unit for providing optical switching control for the electrochromic device. In one embodiment, the window unit further includes: a second substantially transparent substrate; and a sealing separator between the first and second substantially transparent substrates, which sealing separator defines, together with the first and second substantially transparent substrates, an interior region that is thermally insulating. In one embodiment, the controller is embedded in the sealing separator. In one embodiment, the controller includes control logic for directing electrochromic device to switch between three or more optical states. In one embodiment, the controller is configured to prevent the electrochromic device from being connected to in a reverse polarity mode to an external power source. In one embodiment, the controller is configured to be powered by a source delivering between about 2 and 10 volts. There can be included in the window assembly, supply lines for delivering both power and communications to the controller or only power where the controller includes wireless communication capability.

In one embodiment, the window assembly includes an IGU with at least one EC pane; and a window controller configured to control the at least one EC pane of the IGU of the window assembly. Preferably, but not necessarily, the window controller is not positioned within the viewable area of the IGU. In one embodiment, the window controller is positioned outside of the primary seal of the IGU. The controller could be in the window frame and/or in between the panes of the IGU. In one embodiment, the window controller is included with the IGU. That is, the IGU, which includes a "window unit" including two (or more) panes and a separator, also includes the window controller. In one embodiment, the window controller is positioned at least partially between the individual panes of the IGU, outside of the primary seal. In one embodiment, the window controller may span a distance from a point between the two panes of the IGU and a point beyond the panes, for example, so that the portion that extends beyond the panes resides in, at least partially, the frame of the window assembly.

In one embodiment, the window controller is in between and does not extend beyond the individual panes of the IGU. This configuration is desirable because the window controller can be, for example, wired to the EC device(s) of the EC panes of the IGU and included in the secondary sealing of the IGU. This incorporates the window controller into the secondary seal; although it may be partially exposed to the ambient for wiring purposes. In one embodiment, the controller may only need a power socket exposed, and thus be "plugged in" to a low voltage source (for example a 24 v source) because the controller communicates otherwise via wireless technology and/or through the power lines (e.g. like Ethernet over power lines). The wiring from the controller to the EC device, for example between 2 v and 10 v, is minimized due to the proximity of the controller to the EC device.

Electrochromic windows which are suitable for use with controllers described herein include, but are not limited to, EC windows having one, two or more electrochromic panes. Windows having EC panes with EC devices thereon that are all solid state and inorganic EC devices are particularly well suited for controllers described herein due to their excellent switching and transition characteristics as well as low defectivity. Such windows are described in the following U.S. patent application Ser. No. 12/645,111, entitled, "Fabrication of Low-Defectivity Electrochromic Devices," filed on Dec. 22, 2009 and naming Mark Kozlowski et al. as inventors; Ser. No. 12/645,159, entitled, "Electrochromic Devices," filed on Dec. 22, 2009 and naming Zhongchun Wang et al. as inventors; Ser. Nos. 12/772,055 and 12/772,075, each filed on Apr. 30, 2010, and in U.S. patent application Ser. Nos. 12/814,277 and 12/814,279, each filed on Jun. 11, 2010—each of the latter four applications is entitled "Electrochromic Devices," each names Zhongchun Wang et al. as inventors; Ser. No. 12/851,514, filed on Aug. 5, 2010, and entitled "Multipane Electrochromic Windows," each of which is incorporated by reference herein for all purposes. As mentioned, the controllers disclosed herein may useful for switchable optical devices that are not electrochromic devices. Such alternative devices include liquid crystal devices and suspended particle devices.

In certain embodiments, the EC device or devices of the EC windows face the interior region of the IGU to protect them from the ambient. In one embodiment, the EC window includes a two-state EC device. In one embodiment, the EC window has only one EC pane, the pane may have a two-state (optical) EC device (colored or bleached states) or a device that has variable transitions. In one embodiment, the window includes two EC panes, each of which includes a two-state device thereon and the IGU has two optical states, in another embodiment, the IGU has four optical states. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. In one embodiment, the EC window has one pane with an EC device having two states and another pane with an EC device with variable optical state capability. In one embodiment, the EC window has two EC panes, each having an EC device with variable optical state capability. In one embodiment, the EC window includes three or more EC panes.

In certain embodiments, the EC windows are low-defectivity windows. In one embodiment, the total number of visible defects, pinholes and short-related pinholes created from isolating visible short-related defects in an EC device of the EC window is less than about 0.1 defects per square centimeter, in another embodiment, less than about 0.045 defects per square centimeter.

Figure 2A:
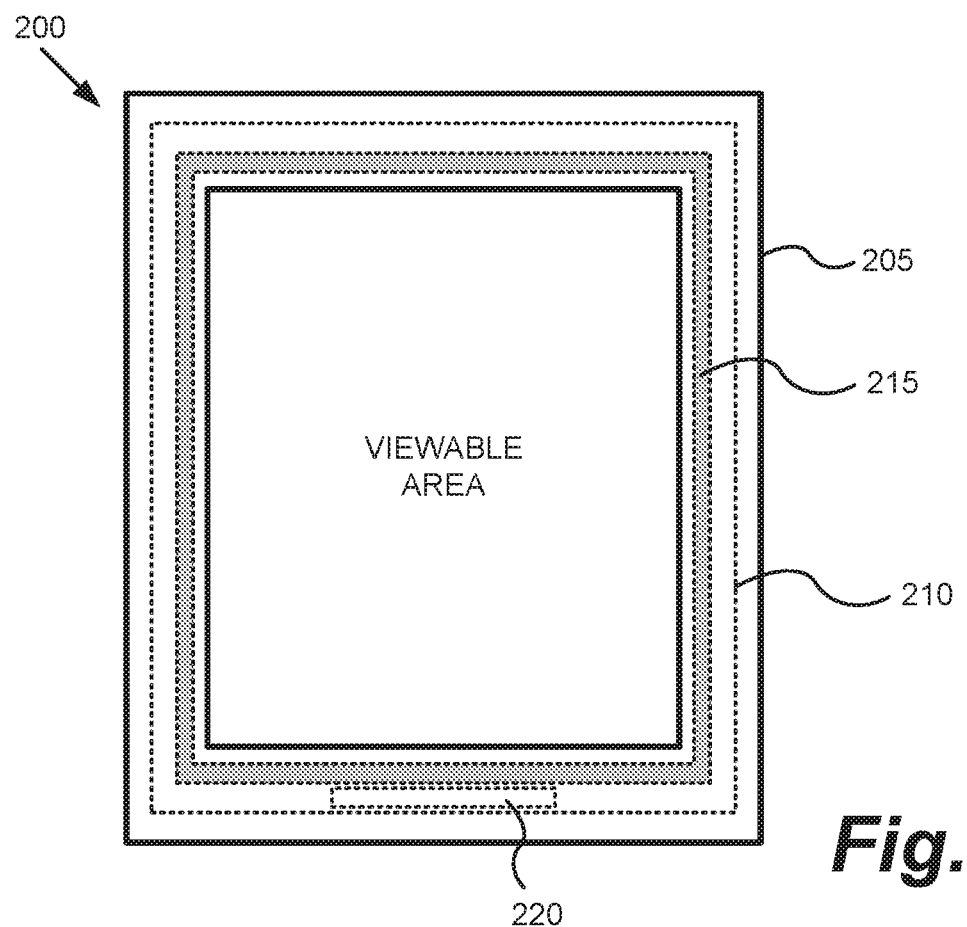
FIG. 2A is a schematic of a window assembly with an IGU having an onboard controller.

FIG. 2A depicts a window assembly, 200, including a window frame, 205. The viewable area of the window unit is indicated on the figure, inside the perimeter of frame 205. As indicated by dotted lines, inside frame 205, is an IGU, 210, which includes two glass panes separated by a sealing separator, 215, shaded in gray. Window controller, 220, is between the glass panes of IGU 210 and, in this example, does not extend beyond the perimeter of the glass panes of the IGU. The window controller need not be incorporated into a single enclosure as depicted, and need not be along a single edge of the IGU. For example, in one embodiment, the controller resides along two, three or four edges of the IGU, in some instances, all within the secondary seal zone. In some embodiments, the window controller can extend beyond the perimeter of the IGU and into the frame of the window assembly.

There are advantages to having the window controller positioned in the frame of the window assembly, particularly in the secondary seal zone of an IGU, some of these include: 1) wiring from the controller to one or more EC devices of the IGU panes is very short, and consistent from window to window for a given installation, 2) any custom pairing and tuning of controller and IGU can be done at the factory without chances of mis-pairing controller and window in the field, 3) even if there are no mismatches, there are fewer parts to ship, track and install, 4) there is no need for a separate housing and installation for the controller, because the components of the controller can be incorporated into the secondary seal of the IGU, 5) wiring coming to the window can be higher voltage wiring, for example 24V or 48V, and thus line losses seen in lower voltage lines (e.g. less than 10V DC) are obviated, 6) this configuration allows in-situ connection to control feedback and diagnostic sensors, obviating the need for long wiring to remote controllers, and 7) the controller can store pertinent information about the IGU, for example using an RFID tag and/or memory such as solid state serial memory (e.g. I2C or SPI) which may optionally be programmable. Stored information may include, for example, the manufacturing date, batch ID, window size, warranty information, EC device cycle count, current detected window condition (e.g., applied voltage, temperature, % Tvis), window drive configuration parameters, controller zone membership, and like information, which will be further described below. These benefits save time, money and installation downtime, as well as providing more design flexibility for control and feedback sensing. More details of the window controller are described below.

One embodiment is a window assembly (or IGU) having at least one EC pane, where the window assembly (or IGU) includes a window controller. In one embodiment, the window controller includes: a power converter configured to convert a low voltage, for example 24V, to the power requirements of said at least one EC pane, for example between 2V and 10V; a communication circuit for receiving and sending commands to and from a remote controller, and receiving and sending input to and from; a microcontroller including a logic for controlling said at least one EC pane based at least in part by input received from one or more sensors; and a driver circuit for powering said at least one EC device.

Figure 2B:
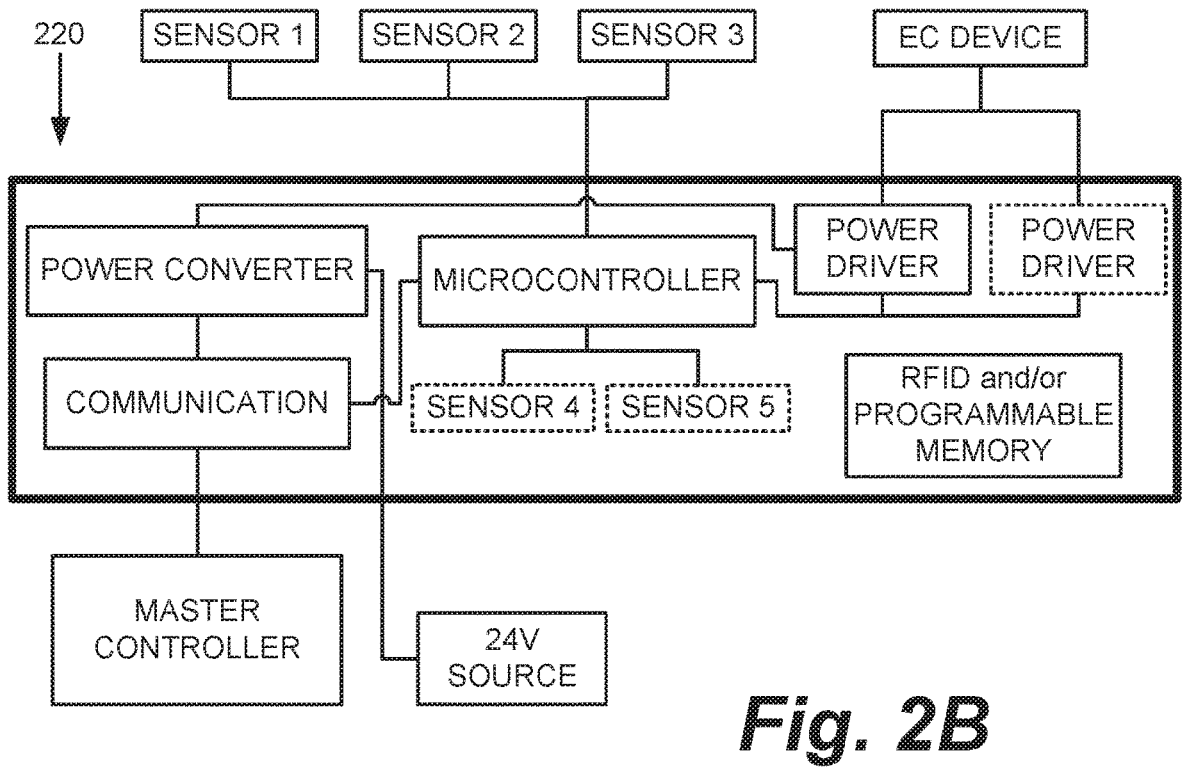
FIG. 2B is a schematic of an onboard window controller.

FIG. 2B, depicts an example window controller 220 in some detail. Controller 220 includes a power converter configured to convert a low voltage to the power requirements of an EC device of an EC pane of an IGU. This power is typically fed to the EC device via a driver circuit (power driver). In one embodiment, controller 220 has a redundant power driver so that in the event one fails, there is a back up and the controller need not be replaced or repaired.

Controller 220 also includes a communication circuit (labeled "communication" in FIG. 2B) for receiving and sending commands to and from a remote controller (depicted in FIG. 2B as "master controller"). The communication circuit also serves to receive and send input to and from a microcontroller. In one embodiment, the power lines are also used to send and receive communications, for example, via protocols such as ethernet. The microcontroller includes a logic for controlling the at least one EC pane based, at least in part, by input received from one or more sensors. In this example sensors 1-3 are, for example, external to controller 220, for example in the window frame or proximate the window frame. In one embodiment, the controller has at least one or more internal sensors. For example, controller 220 may also, or in the alternative, have "onboard" sensors 4 and 5. In one embodiment, the controller uses the EC device as a sensor, for example, by using current-voltage (I/V) data obtained from sending one or more electrical pulses through the EC device and analyzing the feedback. This type of sensing capability is described in U.S. patent application Ser. No. 13/049,756 naming Brown et al. as inventors, titled "Multipurpose Controller for Multistate Windows" and filed on the same day as the present application, which is incorporated by reference herein for all purposes.

In one embodiment, the controller includes a chip, a card or a board which includes appropriate logic, programmed and/or hard coded, for performing one or more control functions. Power and communication functions of controller 220 may be combined in a single chip, for example, a programmable logic device (PLD) chip, field programmable gate array (FPGA) or similar device. Such integrated circuits can combine logic, control and power functions in a single programmable chip. In one embodiment, where the EC window (or IGU) has two EC panes, the logic is configured to independently control each of the two EC panes. In one embodiment, the function of each of the two EC panes is controlled in a synergistic fashion, that is, so that each device is controlled in order to complement the other. For example, the desired level of light transmission, thermal insulative effect, and/or other property are controlled via combination of states for each of the individual devices. For example, one EC device may have a colored state while the other is used for resistive heating, for example, via a transparent electrode of the device. In another example, the two EC device's colored states are controlled so that the combined transmissivity is a desired outcome.

Controller 220 may also have wireless capabilities, such as control and powering functions. For example, wireless controls, such as RF and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Wireless communication can be used in the window controller for at least one of programming and/or operating the EC window, collecting data from the EC window from sensors as well as using the EC window as a relay point for wireless communication. Data collected from EC windows also may include count data such as number of times an EC device has been activated (cycled), efficiency of the EC device over time, and the like. Each of these wireless communication features is described in U.S. patent application Ser. No. 13/049,756, naming Brown et al. as inventors, titled "Multipurpose Controller for Multistate Windows" and filed on the same day as the present application, which was incorporated by reference above.

Also, controller 220 may have wireless power function. That is, controller 220 may have one or more wireless power receivers, that receive transmissions from one or more wireless power transmitters and thus controller 220 can power the EC window via wireless power transmission. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. Exemplary wireless power functions of electrochromic windows is described in U.S. patent application Ser. No. 12/971,576, filed Dec. 17, 2010, titled "Wireless Powered Electrochromic Windows", and naming Robert Rozbicki as inventor, which is incorporated by reference herein in its entirety.

Controller 220 may also include an RFID tag and/or memory such as solid-state serial memory (e.g. I2C or SPI) which may optionally be a programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (RF) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it is used in enterprise supply chain management to improve the efficiency of inventory tracking and management.

In one embodiment, the RFID tag or other memory is programmed with at least one of the following types of data: warranty information, installation information, vendor information, batch/inventory information, EC device/IGU characteristics, EC device cycling information and customer information. Examples of EC device characteristics and IGU characteristics include, for example, window voltage ($V_W$), window current ($I_W$), EC coating temperature (TEC), glass visible transmission (% $T_{vis}$), % tint command (external analog input from BMS), digital input states, and controller status. Each of these represents upstream information that may be provided from the controller to a BMS or window management system or other building device. The window voltage, window current, window temperature, and/or visible transmission level may be detected directly from sensors on the windows. The % tint command may be provided to the BMS or other building device indicating that the controller has in fact taken action to implement a tint change, which change may have been requested by the building device. This can be important because other building systems such as HVAC systems might not recognize that a tint action is being taken, as a window may require a few minutes (e.g., 10 minutes) to change state after a tint action is initiated. Thus, an HVAC action may be deferred for an appropriate period of time to ensure that the tinting action has sufficient time to impact the building environment. The digital input states information may tell a BMS or other system that a manual action relevant to the smart window has been taken. See block 504 in FIG. 5A. Finally, the controller status may inform the BMS or other system that the controller in question is operational, or not, or has some other status relevant to its overall functioning.

Examples of downstream data from a BMS or other building system that may be provided to the controller include window drive configuration parameters, zone membership (e.g. what zone within the building is this controller part of), % tint value, digital output states, and digital control (tint, bleach, auto, reboot, etc.). The window drive parameters may define a control sequence (effectively an algorithm) for changing a window state. Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit. Examples of the application of such window drive parameters are presented in U.S. patent application Ser. No. 13/049,623, naming Pradhan, Mehtani, and Jack as inventors, titled "Controlling Transitions In Optically Switchable Devices" and filed on the same day as the present application, which is incorporated herein by reference in its entirety.

The % tint value may be an analog or digital signal sent from the BMS or other management device instructing the onboard controller to place its window in a state corresponding to the % tint value. The digital output state is a signal in which the controller indicates that it has taken action to begin tinting. The digital control signal indicates that the controller has received a manual command such as would be received from an interface 504 as shown in FIG. 5B. This information can be used by the BMS to, for example, log manual actions on a per window basis.

In one embodiment, a programmable memory is used in controllers described herein. This programmable memory can be used in lieu of, or in conjunction with, RFID technology. Programmable memory has the advantage of increased flexibility for storing data related to the IGU to which the controller is matched.

Figure 1B:
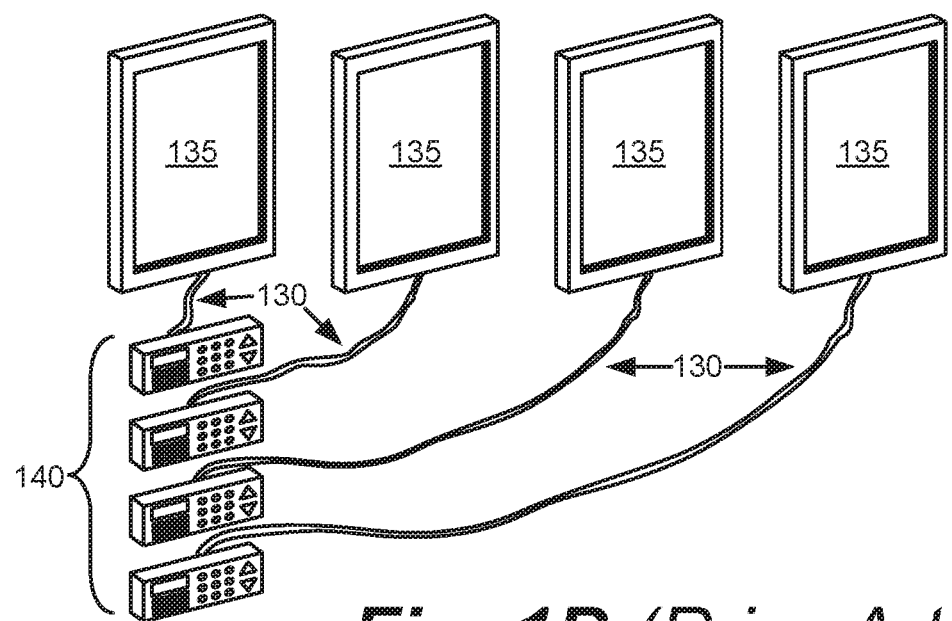
FIG. 1B depicts a conventional wiring scheme for EC window controllers.
Figure 3:
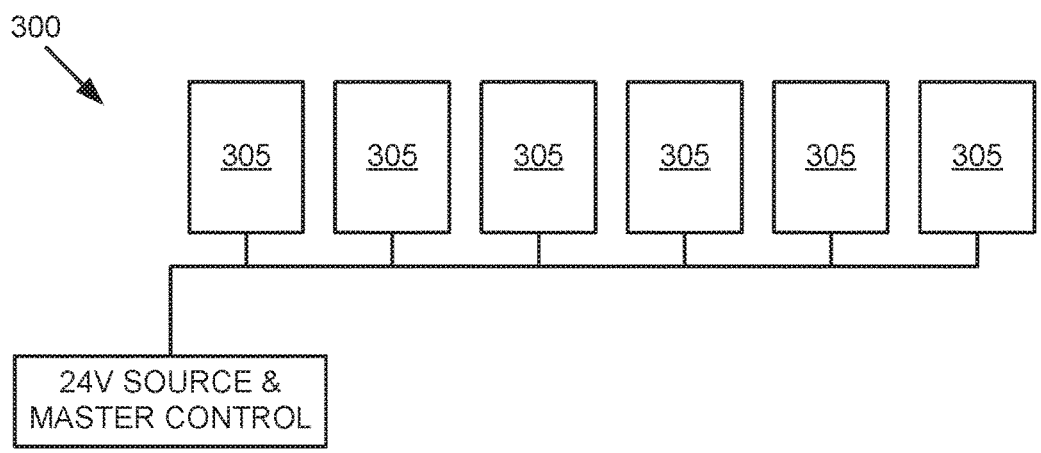
FIG. 3 depicts a wiring scheme including EC windows with onboard window controllers.
Figure 4:
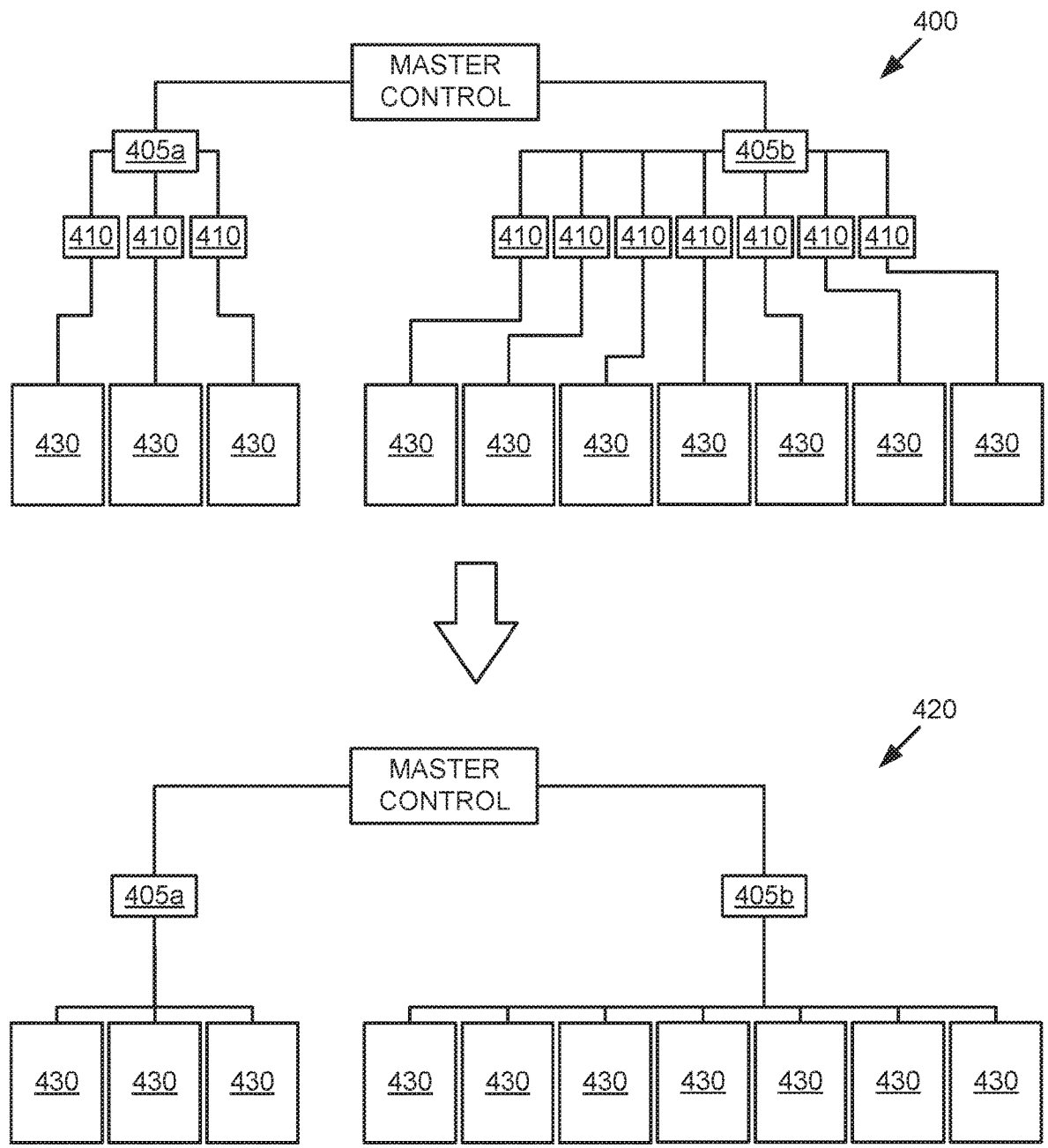
FIG. 4 depicts a distributed network of EC window controllers with conventional end or leaf controllers as compared to a distributed network with EC windows having onboard controllers

Advantages of "localized" controllers, particularly "in situ" or "onboard" controllers, described herein are further described in relation to FIGS. 3 and 4. FIG. 3 depicts an arrangement, 300, including EC windows, 305, each with an associated localized or onboard window controller (not shown). FIG. 3 illustrates that with onboard controllers, wiring, for example for powering and controlling the windows, is very simplified versus, for example, conventional wiring as depicted in FIG. 1B. In this example, a single power source, for example low voltage 24V, can be wired throughout a building which includes windows 305. There is no need to calibrate various controllers to compensate for variable wiring lengths and associated lower voltage (e.g. less than 10V DC) to each of many distant windows. Because there are not long runs of lower voltage wiring, losses due to wiring length are reduced or avoided, and installation is much easier and modular. If the window controller has wireless communication and control, or uses the power lines for communication functions, for example ethernet, then only a single voltage power wiring need be strung through the building. If the controller also has wireless power transmission capabilities, then no wiring is necessary, since each window has its own controller.

FIG. 4 depicts a distributed network, 400, of EC window controllers with conventional end or leaf controllers as compared to a distributed network, 420, with EC windows having onboard controllers. Such networks are typical in large commercial buildings that may include smart windows.

In network 400, a master controller controls a number of intermediate controllers, 405*a* and 405*b*. Each of the intermediate controllers in turn controls a number of end or leaf controllers, 410. Each of controllers 410 controls an EC window. Network 400 includes the long spans of lower DC voltage, for example a few volts, wiring and communication cables from each of leaf controllers 410 to each window 430. In comparison, by using onboard controllers as described herein, network 420 eliminates huge amounts of lower DC voltage wiring between each end controller and its respective window. Also this saves an enormous amount of space that would otherwise house leaf controllers 410. A single low voltage, e.g. from a 24 v source, is provided to all windows in the building, and there is no need for additional lower voltage wiring or calibration of many windows with their respective controllers. Also, if the onboard controllers have wireless communication function or capability of using the power wires, for example as in ethernet technology, there is no need for extra communication lines between intermediate controllers 405*a* and 405*b* and the windows.

Figure 5A:
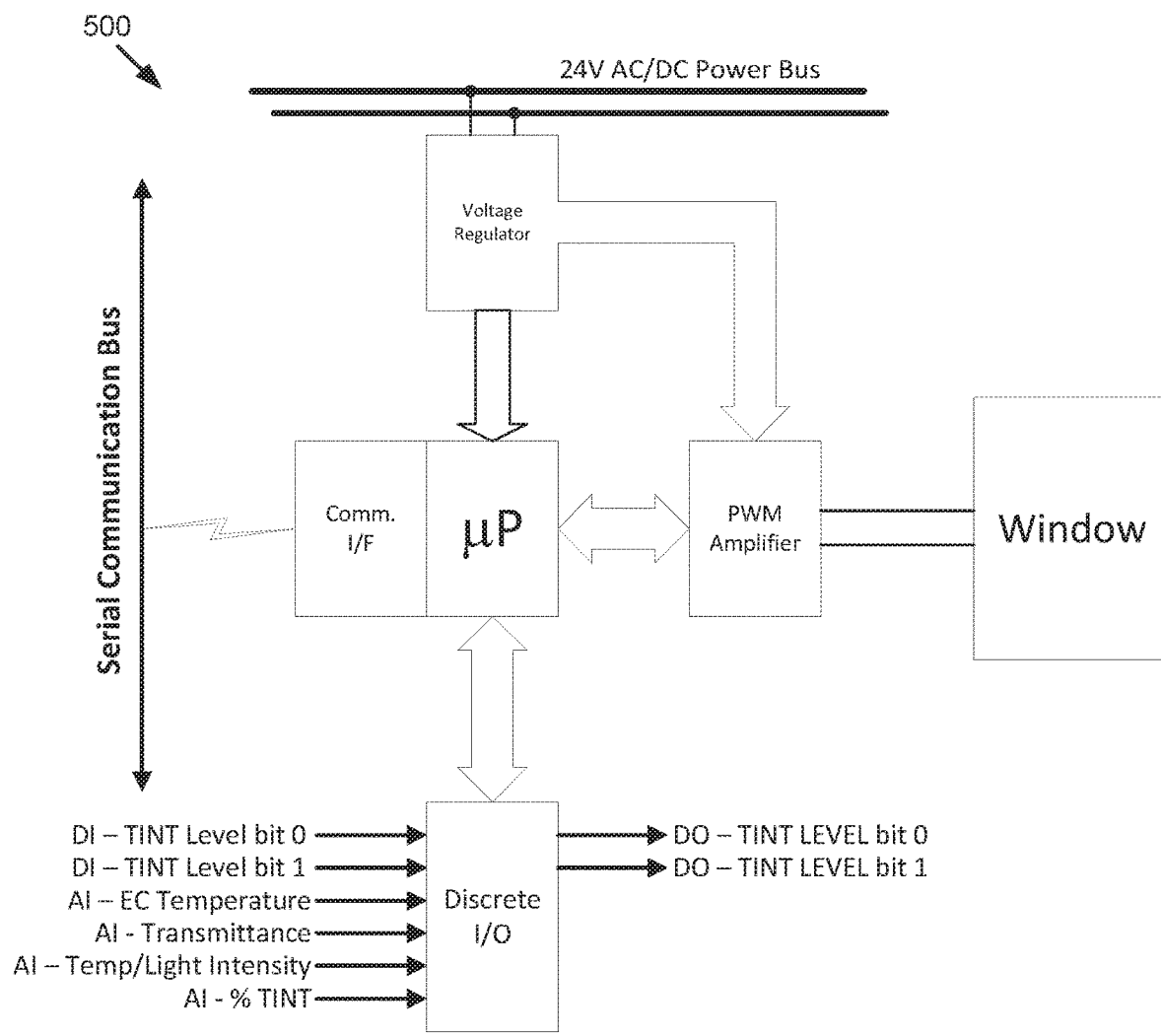
FIG. 5A is a schematic of an onboard window controller.
Figure 5B:
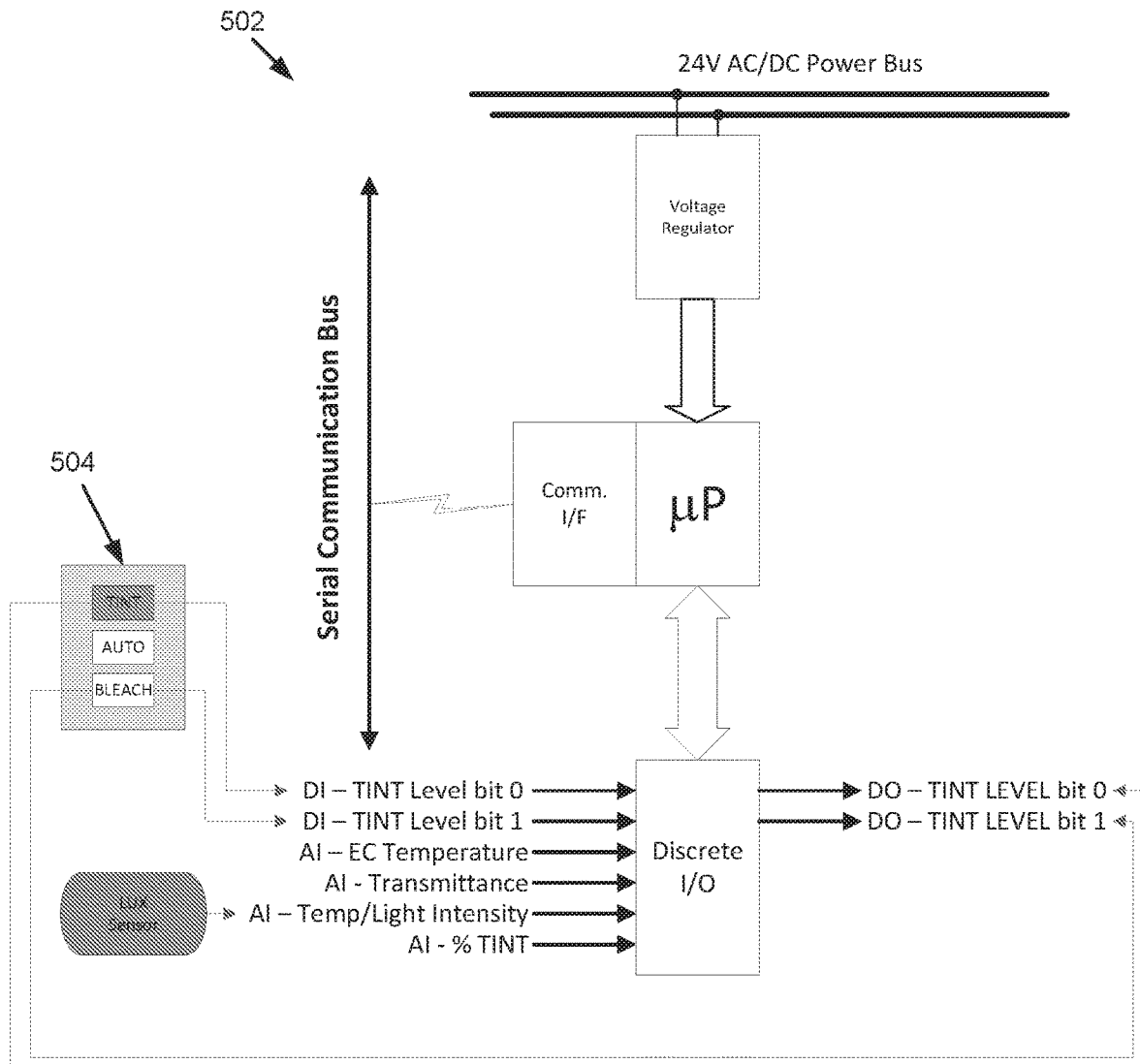
FIG. 5B depicts a user interface for localized controllers described herein.

FIG. 5A is a schematic depiction of an onboard window controller configuration, 500, including interface for integration of EC windows into, for example, a residential system or a building management system. A voltage regulator accepts power from a standard 24 v AC/DC source. The voltage regulator is used to power a microprocessor (.mu.P) as well as a pulse width modulated (PWM) amplifier which can generate current at high and low output levels, for example, to power an associated smart window. A communications interface allows, for example, wireless communication with the controller's microprocessor. In one embodiment, the communication interface is based on established interface standards, for example, in one embodiment the controller's communication interface uses a serial communication bus which may be the CAN 2.0 physical layer standard introduced by Bosch widely used today for automotive and industrial applications. "CAN" is a linear bus topology allowing for 64 nodes (window controllers) per network, with data rates of 10 kbps to 1 Mbps, and distances of up to 2500 m. Other hard wired embodiments include MODBUS, LonWorks™, power over Ethernet, BACnet MS/TP, etc. The bus could also employ wireless technology (e.g. Zigbee, Bluetooth, etc.).

In the depicted embodiment, the controller includes a discrete input/output (DIO) function, where a number of inputs, digital and/or analog, are received, for example, tint levels, temperature of EC device(s), % transmittance, device temperature (for example from a thermistor), light intensity (for example from a LUX sensor) and the like. Output includes tint levels for the EC device(s). The configuration depicted in FIG. 5A is particularly useful for automated systems, for example, where an advanced BMS is used in conjunction with EC windows having EC controllers as described herein. For example, the bus can be used for communication between a BMS gateway and the EC window controller communication interface. The BMS gateway also communicates with a BMS server.

Some of the functions of the discrete I/O will now be described.

DI-TINT Level bit 0 and DI-TINT Level bit 1: These two inputs together make a binary input (2 bits or $2^2=4$ combinations; 00, 01, 10 and 11) to allow an external device (switch or relay contacts) to select one of the four discrete tint states for each EC window pane of an IGU. In other words, this embodiment assumes that the EC device on a window pane has four separate tint states that can be set. For IGUs containing two window panes, each with its own four-state TINT Level, there may be as many as eight combinations of binary input. See U.S. patent application Ser. No. 12/851,514, filed on Aug. 5, 2010 and previously incorporated by reference. In some embodiments, these inputs allow users to override the BMS controls (e.g. untint a window for more light even though the BMS wants it tinted to reduce heat gain).

AI-EC Temperature: This analog input allows a sensor (thermocouple, thermistor, RTD) to be connected directly to the controller for the purpose of determining the temperature of the EC coating. Thus temperature can be determined directly without measuring current and/or voltage at the window. This allows the controller to set the voltage and current parameters of the controller output, as appropriate for the temperature.

AI-Transmittance: This analog input allows the controller to measure percent transmittance of the EC coating directly. This is useful for the purpose of matching multiple windows that might be adjacent to each other to ensure consistent visual appearance, or it can be used to determine the actual state of the window when the control algorithm needs to make a correction or state change. Using this analog input, the transmittance can be measured directly without inferring transmittance using voltage and current feedback.

AI-Temp/Light Intensity: This analog input is connected to an interior room or exterior (to the building) light level or temperature sensor. This input may be used to control the desired state of the EC coating several ways including the following: using exterior light levels, tint the window (e.g. bright outside, tint the window or vice versa); using and exterior temperature sensor, tint the window (e.g. cold outside day in Minneapolis, untint the window to induce heat gain into the room or vice versa, warm day in Phoenix, tint the widow to lower heat gain and reduce air conditioning load).

AI-% Tint: This analog input may be used to interface to legacy BMS or other devices using 0-10 volt signaling to tell the window controller what tint level it should take. The controller may choose to attempt to continuously tint the window (shades of tint proportionate to the 0-10 volt signal, zero volts being fully untinted, 10 volts being fully tinted) or to quantize the signal (0-0.99 volt means untint the window, 1-2.99 volts means tint the window 5%, 3-4.99 volts equals 40% tint, and above 5 volts is fully tinted). When a signal is present on this interface it can still be overridden by a command on the serial communication bus instructing a different value.

DO-TINT LEVEL bit 0 and bit 1: This digital input is similar to DI-TINT Level bit 0 and DI-TINT Level bit 1. Above, these are digital outputs indicating which of the four states of tint a window is in, or being commanded to. For example if a window were fully tinted and a user walks into a room and wants them clear, the user could depress one of the switches mentioned and cause the controller to begin untinting the window. Since this transition is not instantaneous, these digital outputs will be alternately turned on and off signaling a change in process and then held at a fixed state when the window reaches its commanded value.

FIG. 5B depicts an onboard controller configuration 502 having a user interface. For example, where automation is not required, the EC window controller, for example as depicted in FIG. 5A, can be populated without the PWM components and function as I/O controller for an end user where, for example, a keypad, 504, or other user controlled interface is available to the end user to control the EC window functions. The EC window controller and optionally I/O controllers can be daisy chained together to create networks of EC windows, for automated and non-automated EC window applications.

Figure 6:
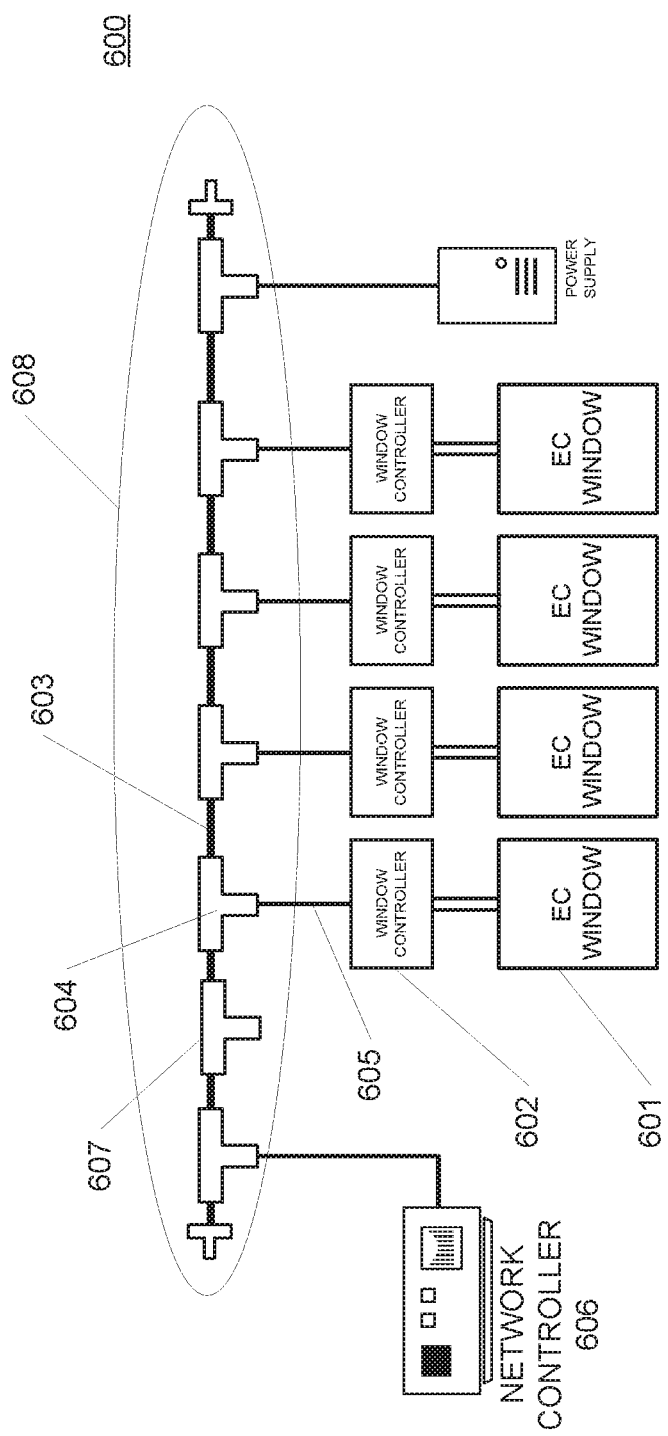
FIG. 6 depicts a network of connected EC windows.

FIG. 6 depicts a network of EC windows and EC window controllers. In network 600, a bus enables setting and monitoring individual window 601 parameters and relaying that information to a network controller 606. In one embodiment, the bus includes a trunk line 608 and electrical connectors 604. In one embodiment, the trunk line includes a 5 conductor cable with two electrical conductors that provide power signals, two electrical conductors that provide communication signals, and one conductor that provides ground. In other embodiments, a cable with fewer or more electrical conductors can be used if so desired or needed. In one embodiment, connectors 604 physically and electrically connect trunk line segments 603 together to form trunk line 608. In one embodiment, signals carried by trunk line 608 are distributed to respective window controllers 602 via respective connectors 604 and respective drop lines 605 connected to the connectors. Although FIG. 6 represents controllers 602 as being spatially separated from respective windows 601, it is to be understood that in other embodiments, one or more of the window controllers could be integrated in or as part of a respective window. In one embodiment, during initial installation or after installation of the trunk line, one or more additional connector 607 is connected to form trunk line 608. After installation, additional connector 607 can be left unconnected until needed, for example, for use with a drop line, a window controller, a power supply, or with a tester. Correct operation and connection of an installed network of EC windows, controllers, connectors, and trunk and drop lines can be verified during a process known as commissioning. Some embodiments of commissioning are described in U.S. Provisional Patent Application No. 62/305,892, filed Mar. 9, 2016, and titled "METHOD OF COMMISSIONING ELECTROCHROMIC WINDOWS"; and U.S. Provisional Patent Application No. 62/370,174, filed Aug. 2, 2016, and tided "METHOD OF COMMISSIONING ELECTROCHROMIC WINDOWS", both of which are incorporated herein in their entirety by reference.

Figure 7:
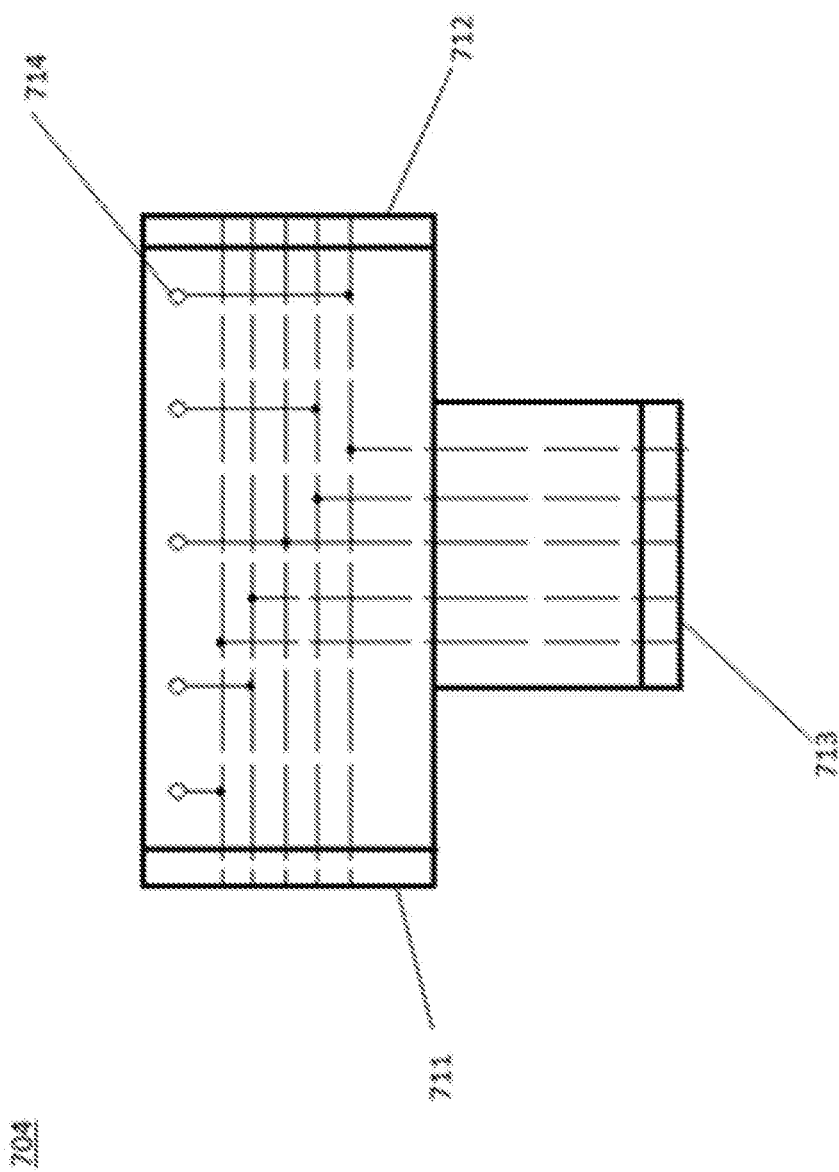
FIGS. 7-10 depict electrical connectors consistent with embodiments described herein.

FIG. 7 represents an embodiment of a connector 704 including a body with two ends 711/712 configured to conductively and mechanically couple two trunk line segments together (see 603 in FIG. 6), the body further having a third end 713 configured to be conductively and mechanically coupled to a drop line (see 605 in FIG. 6). In one embodiment, one or more of ends 711/712/713 are threaded. In one embodiment, ends 711/712/713 include conductive structures that provide conductive access to electrical conductors (depicted by dashed lines) that extend within connector 704 between ends 711/712/713. In one embodiment, the conductive structures include conductive female or male pins. In one embodiment, end 711 of connector 704 is configured with male pins, and ends 712 and 713 are configured with female pins. In one embodiment, connector 704 further includes a number of externally accessible electrical test points 714, each of which is conductively connected to a respective one of the individual electrical conductors. In one embodiment, test points 714 include female pins. In one embodiment, test points 714 are protected from ingress of debris by displaceable or removable covers. In one embodiment, connector 704 includes indicia disposed on an outer surface of the connector. In one embodiment, the indicia include colors and/or numbers that are positioned next to or near test points 714. In one embodiment, when a user desires to conductively access a particular conductor via a test point, the user can identify which test point to use via the color and/or number next to the test point. During network testing and/or troubleshooting, test points 714 enable the presence of signals on any conductor and at any point in a trunk line to be quickly and easily verified by a technician, who can easily do so by connecting leads of a multimeter or other test device to a test point corresponding to a particular colored conductor desired to be tested. Connector 704 facilitates a quick and easy method by which continuity between different electrical conductors and conductive points of interest in a trunk line can be tested without a time consuming process of having to individually disconnect electrical connectors in a trunk line to gain access to electrical conductors and/or having to connect test device leads to electrical conductors that are spatially separated by a distance. For example, two test points of a connector at or near a first point of interest in a trunk line can be shorted together by a jumper, and continuity at two test points corresponding to the electrical conductors at test points of a connector at or near a second point of interest can be measured to verify if continuity along the electrical conductors is present. When a connector that is not connected to a drop line is used in a trunk line (see connector 607 in FIG. 6), conductive structures at exposed unconnected ends of the connector can also be used as test points. In one embodiment, when a connector 607 is used, if desired, it can be provided without test points 714.

Figure 8:
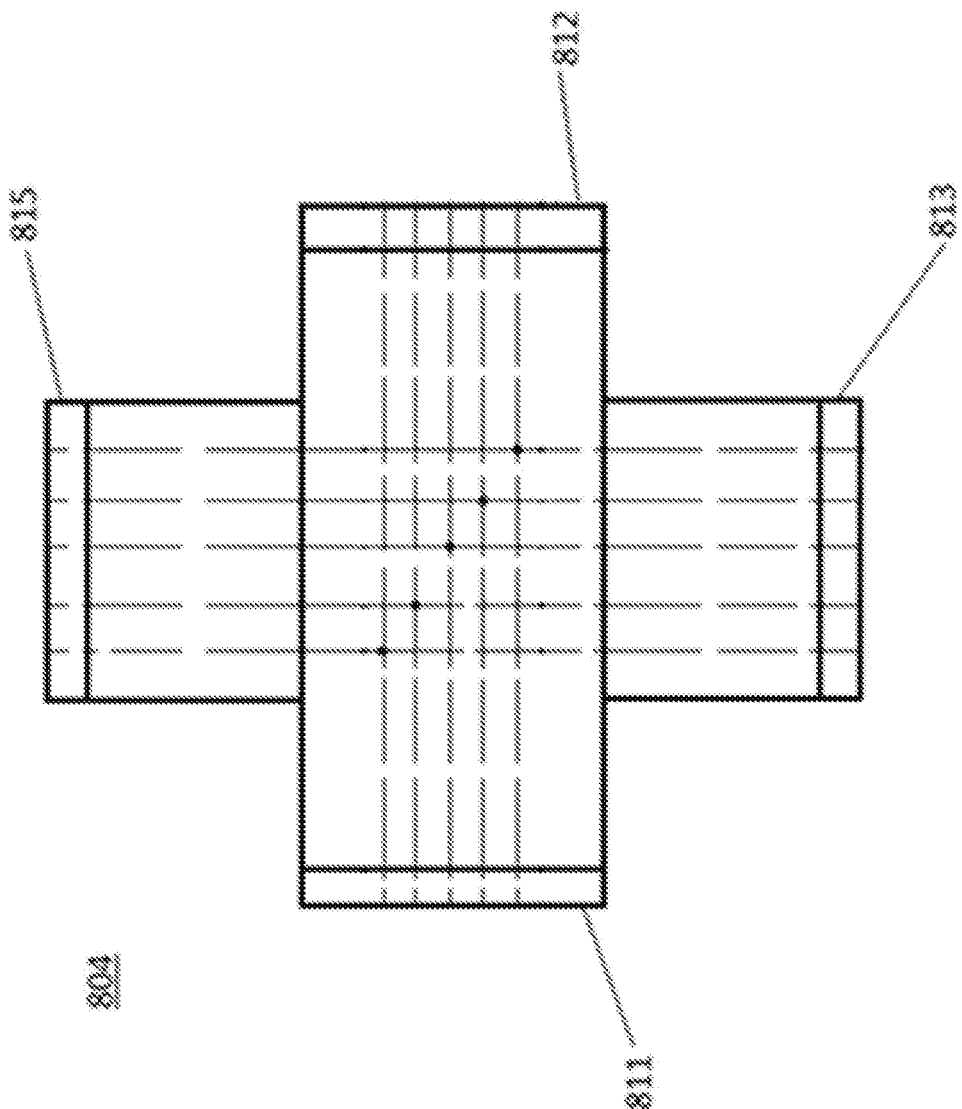

FIG. 8 is a representation of another embodiment of a connector used to couple segments of a trunk line together. In one embodiment, connector 804 provides similar functionality to that provided by the embodiment of FIG. 7, but is different in structure in that conductive and electrical access to electrical conductors of the connector 804 and trunk line segments connected to the connector ends 811 and 812 is provided by test points in the form of conductive structures provided at a fourth end 815 of the connecter. In one embodiment, the conductive structures include male or female pins. In one embodiment, fourth end 815 is provided with a cap that can be removed when access to its test points is desired.

Figure 9:
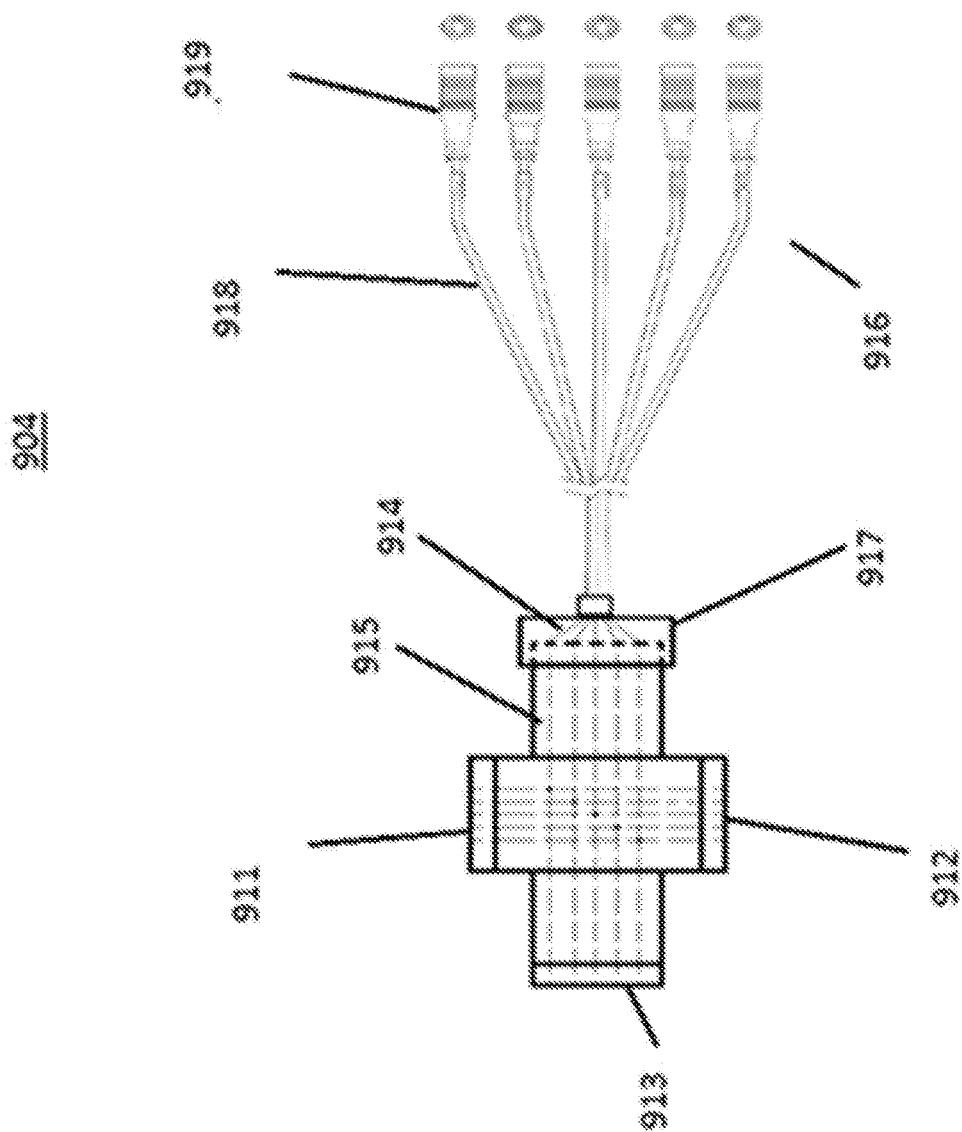

FIG. 9 is a representation of another embodiment of a connector used to couple segments of a trunk line together. In one embodiment, connector 904 provides similar functionality to that provided by the embodiment of FIG. 8, but is different in that access to the test points at a fourth end 915 is provided by flexible insulated electrical conductors 918 of a test lead assembly 916. In one embodiment, electrical conductors 918 extend between ends 914 and 919 of the assembly 916. In one embodiment, test lead assembly 916 is mechanically and electrically coupled to fourth end 915 by threads or other structures capable of maintaining conductive and physical coupling of the ends 914 and 915. In one embodiment, ends 919 facilitate connection to test leads of a test apparatus. In one embodiment, ends include female banana type couplers. In one embodiment, test lead assembly 916 is configured to act as a drop down cable that connects to a controller of a window or that can be unconnected and, when desired, be used to electrically access conductors of a trunk line with a tester. In one embodiment, test lead assembly 916 is formed as an integral unit, for example molding ends 914 and 919 onto conductors 918. In one embodiment, conductors 918 are dimensioned with a length L sufficient to provide technicians easy dropdown access to hard to reach trunk lines or electrical connectors, for example, as may be encountered during testing or troubleshooting a trunk line located in a tall ceiling. In one embodiment, the length L is about 100 cm. In other embodiments, the length can be more than, or less than, 100 cm.

Figure 10:
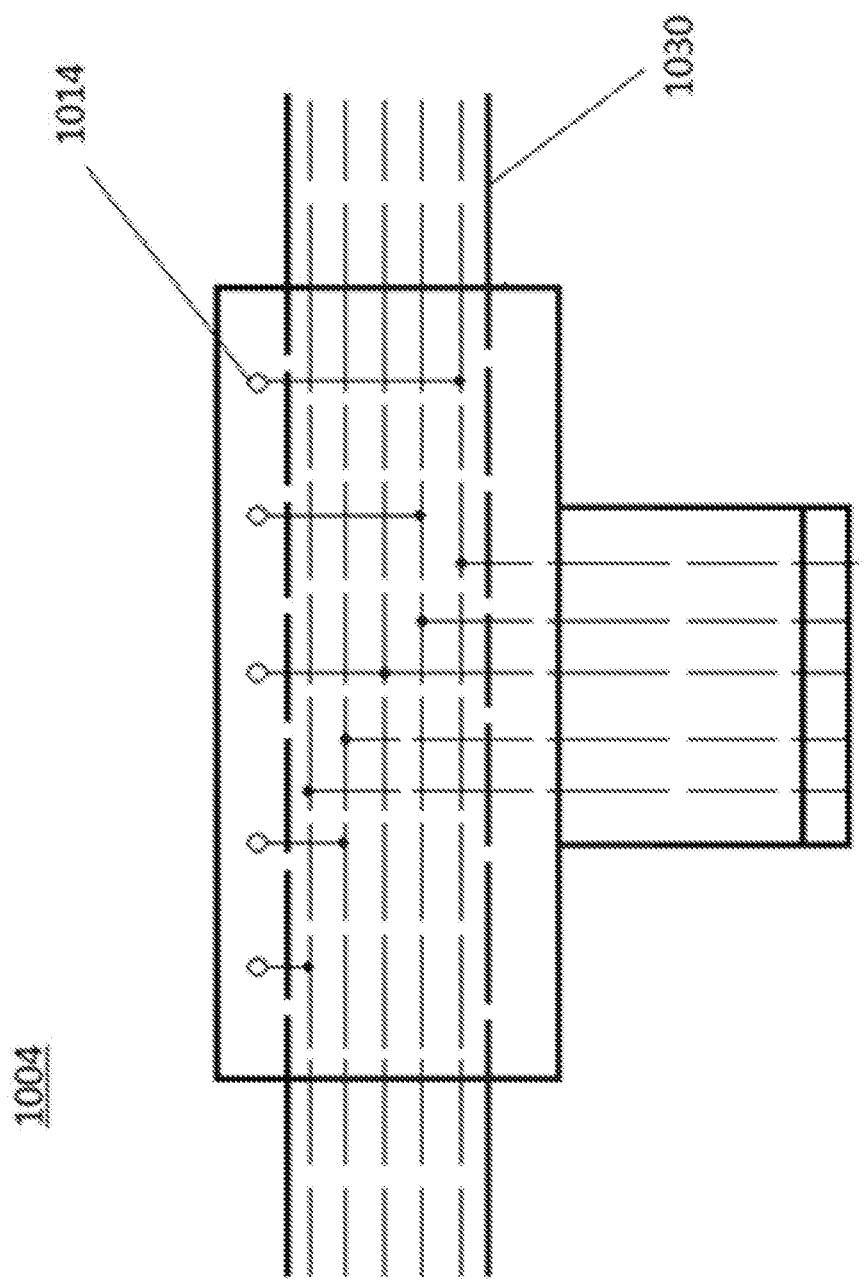

FIG. 10 is a representation of an embodiment of a connector configured to snap or clamp over and provide conductive and electrical access to conductors of a trunk line. In embodiments, trunk line 1030 includes a flat or ribbon cable, or a round cable having one or more flat or ribbon like portions along its length. A connector used to snap or clamp over a trunk line are described in U.S. patent Ser. No. 15/268,204, entitled, "Power Distribution Networks for Electrochromic Devices" filed 16 Sep. 2016, which is incorporated herein in its entirety by reference. In one embodiment, connector 1004 includes electrical test points 1014 that facilitate trunk line testing and troubleshooting in a manner similar to that described above with reference to FIGS. 7 and 8. When flat or ribbon cable or portions form a trunk line, use of connector 1004 enables the trunk line to be formed of continuous cable. Use of continuous cable obviates a-priori calculation of trunk segment lengths and as well performing the time-consuming steps that are needed to connect trunk line segments together to form the trunk line. When a continuous trunk line 1030 is used, the trunk line can be easily and quickly installed above a network of windows, and then as needed or desired, the connectors 1004 can quickly be snapped or clamped over flat portions of the trunk line in locations above the windows.

FIG. 11A is a representation of an embodiment of a connector block used to couple segments of a trunk line together. In one embodiment, a connector block 1104 includes two connector ends 1111/1112 that are configured to be coupled to ends of trunk line segments 1103 of a trunk line. In one embodiment, connector block 1104 is configured to snap or clamp over a flat portion of a trunk line cable. In one embodiment, connector block 1104 is configured to include a plurality of insulated electrical conductors or drop lines 1105 that are used to connect to window controllers 1113. In one embodiment, conductors or drop lines 1105 are integrated to be part of connector block 1104, for example, by molding, or connected to the connector block 1104 via connectors on the connector bloc and drop lines. Use of connector block 1104 enables aggregation of the functionality of a plurality of individual connectors at one location, which reduces the number of trunk line segments and connectors that need to be used to form a trunk line, which in turn enables the trunk line to be assembled more quickly. For example, as depicted in FIG. 11A, one connector block 1104 provides the functionality of 8 separate electrical connectors (drop lines). In other embodiments, the functionality of fewer or more than 8 separate connectors can be provided via the use of a connector block having fewer or more than 8 drop lines 1105. While connector block 1104 is shown as having a rectangular shape, this need not be the case. Connector blocks may have other polygonal shapes, curved shapes, partially curved and partially polygonal shapes, etc. Also, while the connector blocks are shown in the figures as having a relative size with respect to the trunk line segments and drop lines, this depiction is not limiting.

FIG. 11B is another representation of an embodiment of a connector block used to couple segments of a trunk line together. In one embodiment, connector block 1108 is similar to connector block 1104 of represented in FIG. 11A, except that some functionality provided by the window controllers (e.g., window controllers 1113 represented in FIG. 11A) is provided as part of connector block 1108. In such embodiments, the connector block 1108 can be understood to include one or more window controllers. In some embodiments, the window controller functionality is provided in connector block 1108 in the form of one or more circuit boards 1109, which may be configured to removably mate with a base 1115 either directly or via an intervening connector that enables repair, replacement and/or upgrade to downstream components (e.g., circuit boards 1109, conductors or drop lines 1105, window controllers 1113, the windows themselves, etc.) without having to remove or disconnect connector block 1108 from a trunk line or trunk line segment(s). The connector block 1108 may contain logic or other structures for receiving tint change instructions for a corresponding electrochromic window, determining a voltage or current profile for applying to the window to implement the tint transition, applying the profile to a corresponding window, sensing conditions (e.g., voltage and/or current at the window), providing information about the controller and/or corresponding window, or any combination of these. More generally, because the connector block 1108 includes one or more window controller, the connector block may include any one or more of the features described herein with respect to a controller such as a window controller. For instance, the connector block 1108 may have any of the features described in connection with window controller 220 of FIG. 2B. Although FIG. 11B depicts 8 window controllers 1111 as being part of a connector block 1108, in other embodiments, fewer or more that 8 window controllers can be provided with the connector block.

FIG. 12 is a representation of another embodiment of a connector block used to couple segments of a trunk line together. In one embodiment, connector block 1204 is similar to connector block 1104 of the embodiment of FIG. 11A, except that electrical test points 1240 are provided on connector block 1204. In one embodiment, connector block 1204 includes 5 electrical test points, however fewer or more test points can be provided as needed or desired. In one embodiment, access to test points 1240 can be provided via implementation of an extended test lead assembly (see 916 in FIG. 9). In addition to benefits described above, a connector block including test points 1240 provides technicians the added benefit of reducing trunk line test and troubleshooting time, since the number of locations where tests and troubleshooting would potentially need to be performed is reduced. Referring back to FIG. 11B, in one embodiment, connector block 1108 can also be implemented to include test points such as test points 1240.

Figure 13A:
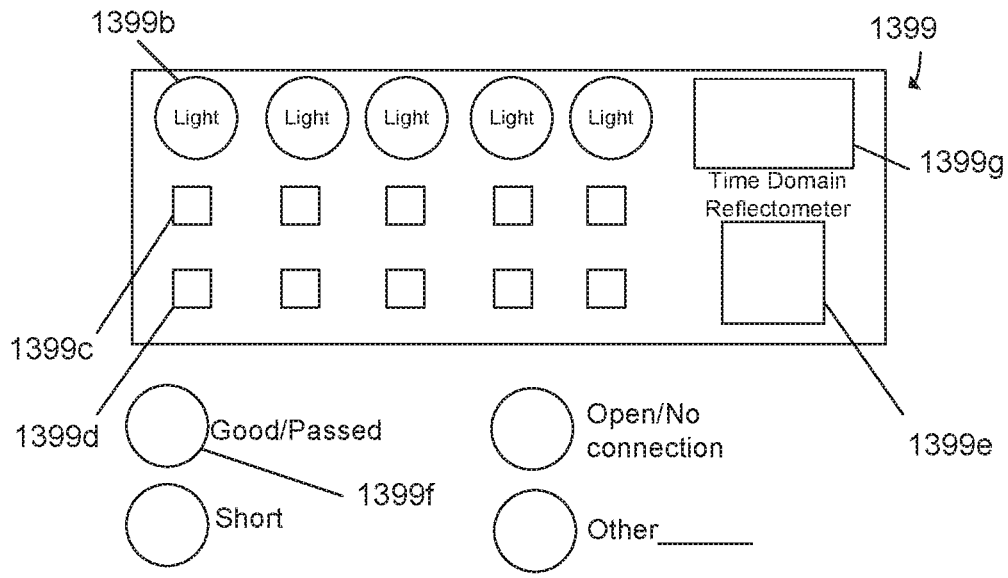
Figure 13B:
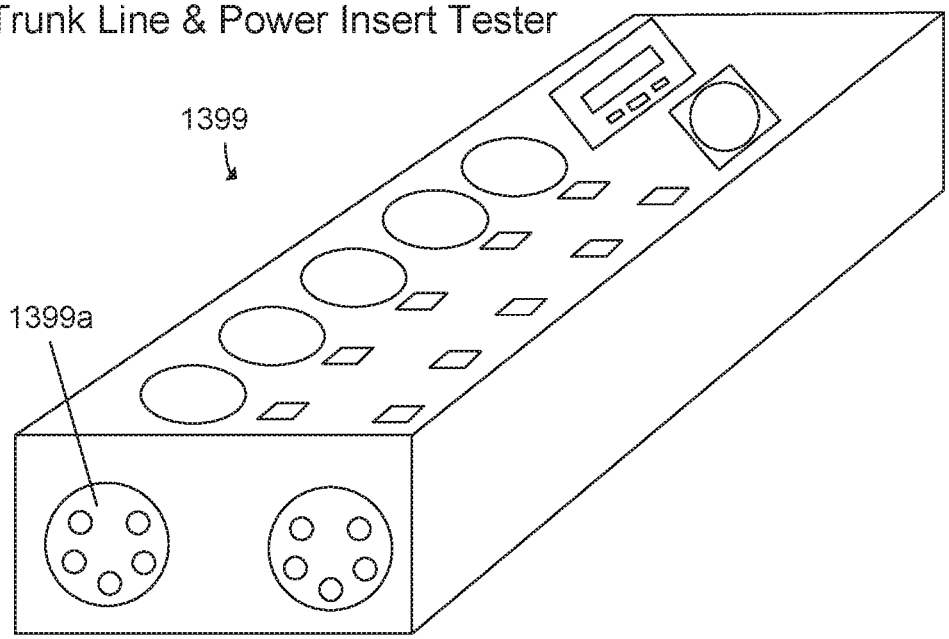

FIGS. 13A and 13B are representations of a trunk line tester. In one embodiment, tester 1399 includes one or more connectors 1399a configured to be conductively coupled to conductors of a trunk line 608 (see FIG. 6). In certain embodiments, connector 1399a includes male or female pins configured to be coupled to conductors of trunk line 608 directly or via one or more conductive cable.

In one embodiment, tester 1399 is configured to test trunk line 608 for: the presence or non-presence of shorts between any two conductors, the presence of an open condition in any conductor, and the location of a short or open condition in any conductor. In some embodiments, tests provided by tester 1399 are performed when a user interacts with inputs 1399c of the tester and/or under the control of a processor, which is optionally provided within the chassis of tester 1399. In one embodiment, tester 1399 provides test functionality via interaction with one or more inputs 1399c provided as rotary switches, toggle switches, push buttons or the like. In one embodiment, test results are provided by tester 1399a via output indicators 1399b, 1399f, and/or 1399g in the form of one or more lights or displays that are on or coupled to the tester. In one embodiment, by activating two inputs 1399c at the same time, tester 1399 measures continuity between conductors of the trunk line that correspond to the inputs. In one embodiment, lights 1399b on the tester work in conjunction with the switches 1399c they are associated with, where each light displays a different color indicative of a particular test condition, for example, green indicates a short between any two conductors, no damage to cable, conductors are good; red indicates there is a short between the two conductors being tested; and yellow indicates there is an open reading on a conductor. In one embodiment, tester 1399 includes one or more inputs 1399d that activate a "TDR" (Time Domain Reflectometer), which can be used to locate and display a location along particular conductor where an open or short is present. In one embodiment, activation of input 1399e causes tests for short and open conditions to be performed and displayed automatically.

Figure 14:
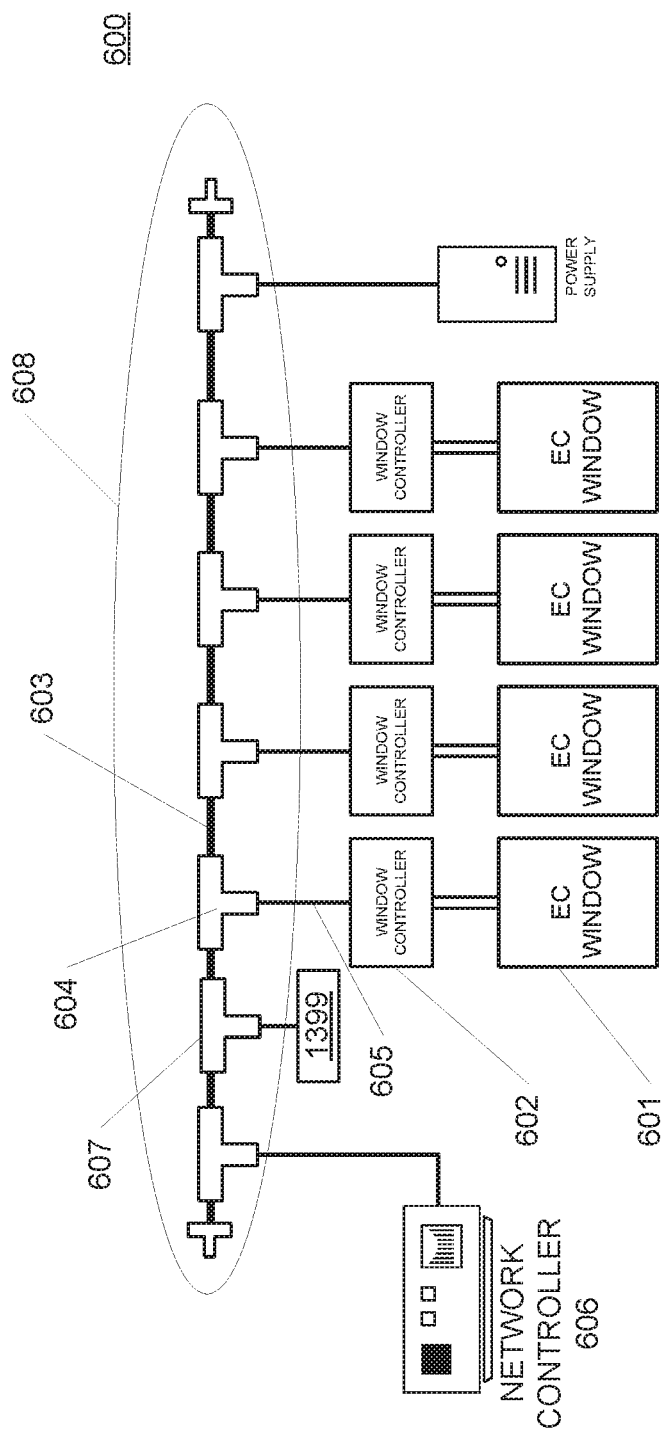

FIG. 14 is a representation of a trunk line tester being used to test a trunk line. In one embodiment where one or more of windows 601 are found to not be functioning, trunk line tester 1399 can be coupled via test points to conductors of a connector 607 to troubleshoot whether and where a malfunction in trunk line 608 is present. In one embodiment of use, an initial step of troubleshooting determines whether the malfunction is to the left or right of connector 607 by first disconnecting the right end of connector from the trunk line and subsequently performing tests on conductors of the trunk line to the left of the connector. Assuming no malfunction is present in the trunk line to the left of connector 607, next the left end of the connector is disconnected, the right end of the connector connected to the trunk line to the right of the connector, and tests are subsequently performed by tester 1399. Assuming the tests indicate a short or open condition, TDR functionality of the tester 1399 can be next used to determine the location of the condition in the trunk line relative to the location of the tester.

Figure 15:
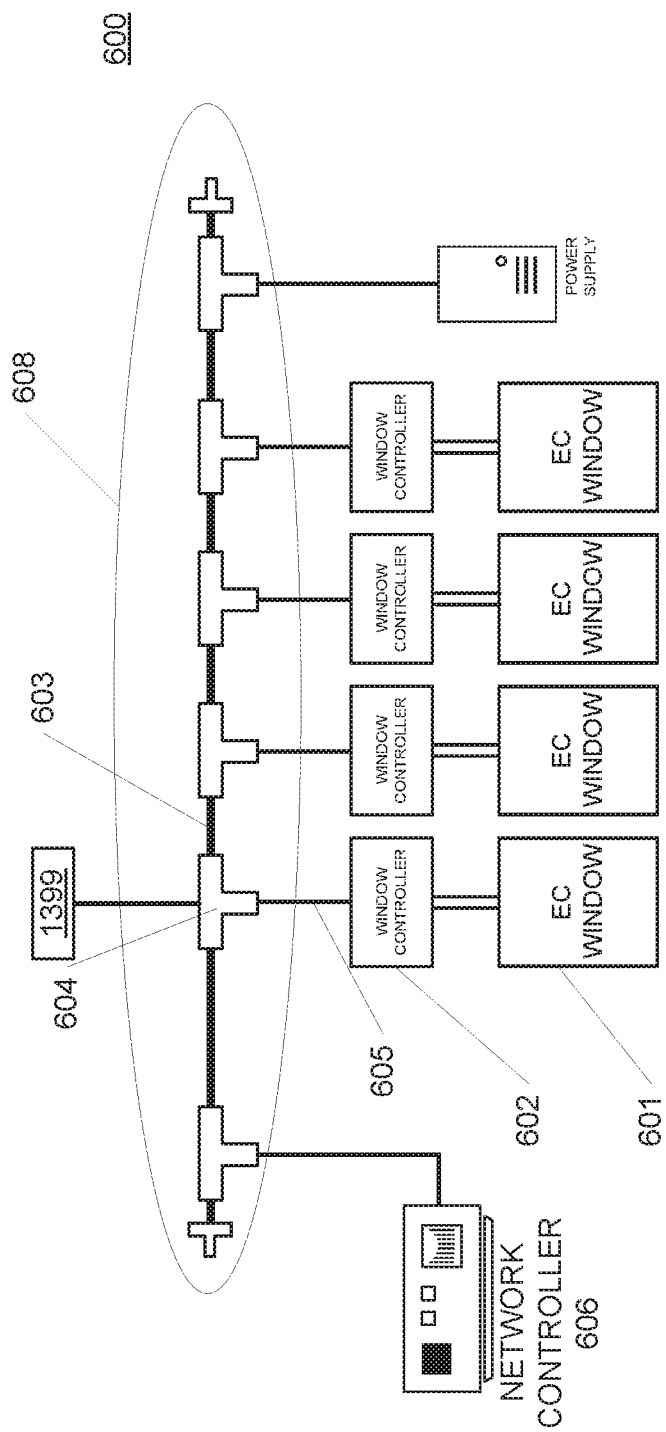

FIG. 15 is another representation of a trunk line tester being used to test a trunk line. In one embodiment where one or more of windows 601 are found to not be functioning, trunk line tester 1399 can be coupled via test points to conductors of a connector 604 to troubleshoot whether and where a malfunction in trunk line 608 is present. In one embodiment of use, an initial step of troubleshooting determines whether the malfunction is to the left or right of connector 604 by first disconnecting the right end of connector from the trunk line and subsequently performing tests on conductors of the trunk line to the left of the connector. Assuming no malfunction is present in the trunk line to the left of connector 604, next the left end of the connector is disconnected, the right end of the connector connected to the trunk line to the right of the connector, and tests are subsequently performed by tester 1399. Assuming the tests indicate a short or open condition, TDR functionality of the tester 1399 can be next used to determine the location of the condition in the trunk line relative to the location of the tester. The representations above are not meant to be limiting as it is understood that trunk line tester 1399 could be coupled to a trunk line at other locations and in other combinations of steps to trouble shoot a trunk line.

Figure 16:
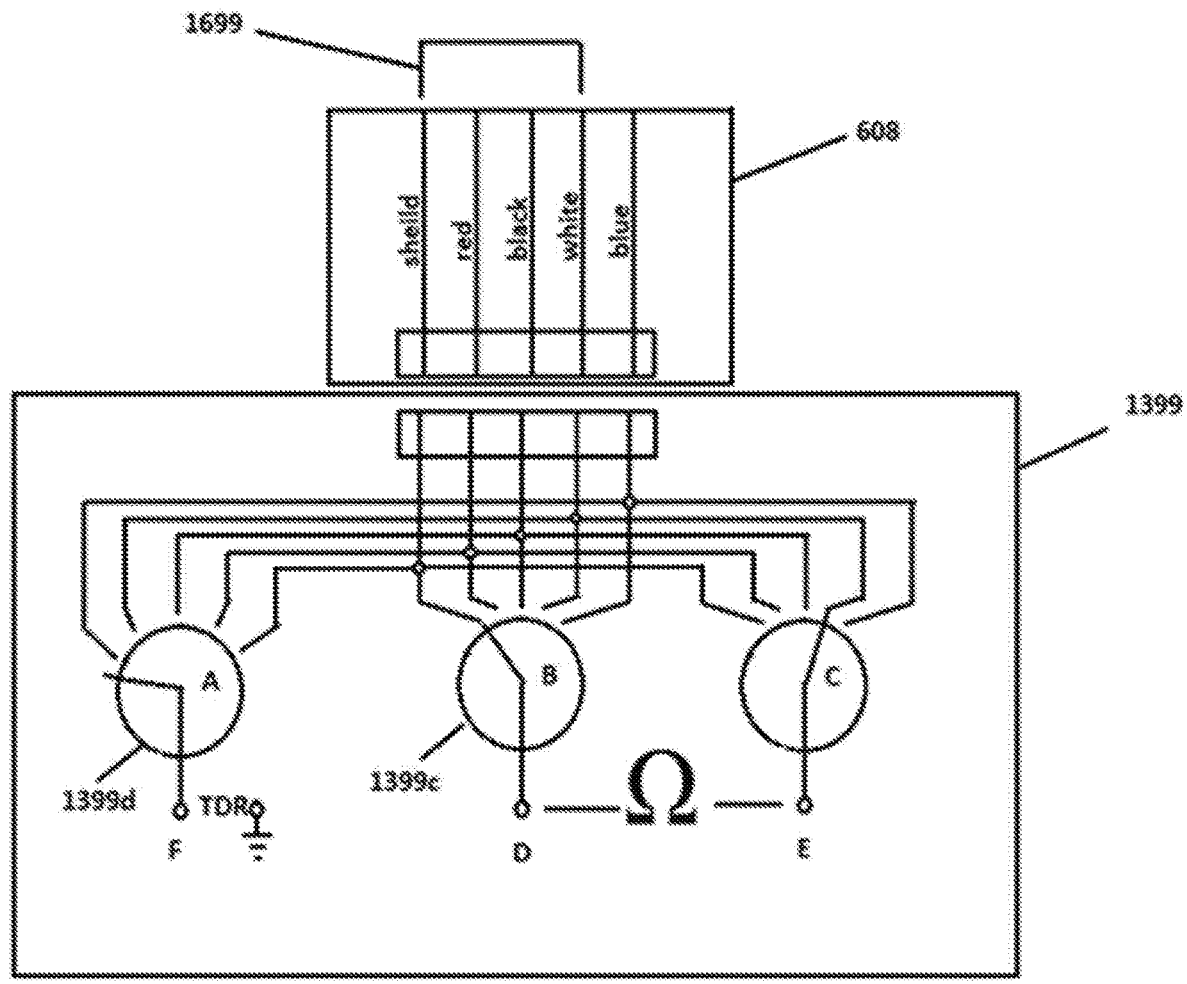

FIG. 16 is a representation of an embodiment of a trunk line tester connected to conductors of a trunk line. In one embodiment, one or more inputs 1399c of a trunk line tester 1399 are embodied in the form of rotary switches A, B, and C. In the representation of FIG. 16, with tester 1399 connected to a trunk line 608, switch B and switch C are positioned to effect coupling of terminals D and E to respective "shield" and "white" conductors of the trunk line such that resistance or impedance measuring functionality that is part of the tester can be used to determine whether there is a short or open between or in the conductors. When testing for an open, a shorting terminator 1699 can be inserted across shield and white conductors at a particular upstream point in the trunk line. As desired or needed, other positions of switches B and C, in combination with termination of other conductors by a shorting terminator, can be used to test trunk line 608. Although trunk line 608 is represented to include 5 conductors, use of trunk lines with fewer or more conductors is within the scope of the disclosed embodiments. Accordingly, a trunk line tester with fewer or more inputs is also within the scope of the disclosed embodiments. FIG. 16 also represents an input 1399d that is configured to test trunk line 608 using a time domain reflectometer (TDR) as known to those skilled in the art, where upon selection of a position of the input to correspond to a particular conductor in the trunk line, signals transmitted by the TDR can be used to determine and display a location of a short or open in the particular conductor selected. The trunk line tester 608 described herein has been described in the context of certain embodiments, however, the tester should not be limited to such, as in other embodiments it is contemplated that the test could be implemented in digital form, where after coupling of a tester including a processor under control of software, the processor could control one or more circuits or components to automatically effect one or more test on the conductors of a trunk line.

FIG. 17 is another representation of a trunk line. In embodiments above, a trunk line includes trunk line segments joined by electrical connectors coupled to window controllers by drop lines. In another embodiment, a trunk line 1708 includes trunk line segments 1703 coupled in series by electrical connectors 1704 that include or are coupled directly to window controllers (described elsewhere herein), each of which in turn is connected to a window 1701. Use of electrical connectors 1704 can facilitate quicker installation and commissioning of windows in a building because it obviates the time needed to connect a controller to the drop line as shown in FIG. 6.

FIG. 18 is a representation of an electrical connector including a window controller. In one embodiment, electrical connector 1804 includes a body with two ends 1811/1812 configured to conductively and mechanically couple two trunk line segments together, the body further having a third end 1813 configured to be directly coupled to a window by a drop line. In one embodiment, electrical connector 1804 includes a window controller 1802 configured to provide window controller functionality as described herein. In one embodiment, window controller 1802 is formed within third end 1813. In one embodiment, the body of electrical connector is molded or formed around window controller 1802. In one embodiment, one or more of ends 1811/1812/1813 are threaded. In one embodiment, ends 1811/1812/1813 comprise conductive structures that provide conductive access to electrical conductors and/or a controller 1802 within connector 1804. In one embodiment, the conductive structures comprise conductive female or male pins.

FIG. 19 is another example of an electrical connector including a window controller. In one embodiment, electrical connector 1904 includes a primary body 1904a with two ends 1911/1912 configured to conductively and mechanically couple two trunk line segments together. In one embodiment, electrical connector 1904 additionally includes a secondary body 1913b having one end configured to be coupled to a window (not shown) and another end configured to be coupled to the primary body 1904a. In one embodiment, secondary body 1913b houses a window controller 1902. In one embodiment, secondary body 1913b includes one end 1913c configured to be electrically and mechanically coupled directly to primary body 1904a and another end 1913d configured to be electrically coupled to a window. In one embodiment, secondary body 1913b is coupled to primary body 1904a via threads. In one embodiment, secondary body 1913b snaps to, in and/or over primary body 1904a. In embodiments, the secondary body 1913b is coupled to primary body via one or more electrical coupling mechanism known to those skilled in the art. In one embodiment, ends 1911/1912/1913c/1913d comprise conductive structures that provide conductive access to electrical conductors and/or controller 1902 within connector 1904. In one embodiment, the conductive structures comprise conductive female or male pins. In one embodiment, electrical connectors 1904 enables testing or replacing of a secondary body 1913b without affecting continuity between other electrical connectors connected in a trunk line. In one embodiment, connector 1904 comprises test points according to embodiments described above.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

The invention claimed is:

1. A system for communicating with optically switchable windows in a building, the system comprising:
   a trunk line configured to provide a communication path to a plurality of optically switchable windows, the trunk line comprising a plurality of trunk line segments, each comprising a plurality of electrical conductors;
   a plurality of window controllers, wherein each window controller is configured to couple to a respective one of the optically switchable windows; and
   a plurality of electrical connector blocks, wherein the plurality of window controllers are embedded within the plurality of electrical connector blocks, and wherein the plurality of electrical connector blocks are configured to be connected in series by the plurality of trunk line segments.

2. The system of claim 1, wherein multiple window controllers of the plurality of window controllers are embedded within each of the plurality of electrical connector blocks.

3. The system of claim 1, wherein the plurality of electrical connector blocks are configured to provide access to the plurality of electrical conductors while connected in series with the plurality of trunk line segments.

4. The system of claim 1, wherein each of the plurality of electrical connector blocks is integrally formed with at least one of the plurality of window controllers.

5. The system of claim 4, wherein each of the plurality of electrical connector blocks comprises a housing forming the electrical connector block, and wherein each of the plurality of window controllers is housed within the housing of one of the plurality of electrical connector blocks.

6. The system of claim 1, wherein the plurality of window controllers is configured to be removable without removal of any of the electrical connector blocks from the trunk line.

7. The system of claim 1, wherein the plurality of electrical connector blocks are coupled to the trunk line via threads.

8. The system of claim 1, wherein the plurality of electrical conductors are continuous between the ends of the trunk line.

9. The system of claim 8, wherein the plurality of electrical connector blocks are snapped over or clamped to the trunk line.

10. The system of claim 1, wherein the trunk line comprises at least one flat or ribbon portion.

11. The system of claim 1, wherein the plurality of electrical connector blocks are defined by a body within or on which a plurality of test points are disposed.

12. The system of claim 11, wherein the plurality of electrical connector blocks are defined by a body from which the plurality of test points extend.

13. The system of claim 12, wherein at least one of the plurality of test points is embodied as a drop line.

14. The system of claim 1, wherein the plurality of optically switchable windows comprise electrochromic windows.

15. A system for communicating with optically switchable windows in a building, the system comprising:
  a trunk line comprising:
    a plurality of trunk line segments, each comprising a plurality of electrical conductors,
    a plurality of electrical connector blocks connected in series by the plurality of trunk line segments, and
    a plurality of window controllers, wherein the plurality of window controllers are embedded within the plurality of electrical connector blocks; and
  a plurality of drop lines configured to communicate data and/or power between the trunk line and the optically switchable windows.

16. A trunk line for providing data and/or power to optically switchable windows in a building, the trunk line comprising:
  a plurality of trunk line segments, each comprising a plurality of electrical conductors;
  a plurality of electrical connector blocks connected in series by the plurality of trunk line segments, wherein at least some of the electrical connector blocks are configured to connect with drop lines for providing data and/or power between the trunk line and the optically switchable windows; and
  a plurality of window controllers, wherein the plurality of window controllers are embedded within the plurality of electrical connector blocks.

17. A system for communicating with optically switchable windows in a building, the system comprising:
  a communication network configured to provide a data communication path from a master controller to a plurality of optically switchable windows disposed at a plurality of locations on or in the building, the data communication path comprising:
  a trunk line comprised of a plurality of electrical conductors;
  a plurality of window controllers;
  a plurality of electrical connector blocks conductively coupled to the trunk line, wherein the plurality of window controllers are embedded within the plurality of electrical connector blocks; and
  a plurality of drop lines coupled to each of the plurality of electrical connector blocks, wherein each of the plurality of optically switchable windows is connected to the trunk line by one of the plurality of drop lines.

18. The system of claim 17, wherein the trunk line comprises trunk line segments coupled by the plurality of electrical connector blocks.

19. The system of claim 17, wherein the plurality of electrical connector blocks are coupled to the trunk line via threads.

20. The system of claim 17, wherein the plurality of electrical conductors are continuous from end to end of the trunk line.

21. The system of claim 20, wherein the plurality of electrical connector blocks are snapped over or clamped to the trunk line.

22. The system of claim 17, wherein the trunk line comprises at least one flat or ribbon portion.

23. The system of claim 17, wherein at least one of the plurality of electrical connector blocks comprise a body within or on which test points configured to be accessed by a tester are disposed.

24. The system of claim 17, wherein at least one of the plurality of electrical connector blocks comprise a body from which test points configured to be accessed by a tester extend.

25. The system of claim 17, wherein the plurality of optically switchable windows comprise electrochromic windows.

* * * * *